US006671800B1

(12) United States Patent
McInally et al.

(10) Patent No.: US 6,671,800 B1
(45) Date of Patent: Dec. 30, 2003

(54) INSTRUCTIONS FOR CREATING AN EXTENSION DATA TO CREATE INSTANCES OF AN OBJECT WITH ADDITIONAL ATTRIBUTES WITHOUT CREATING A NEW OBJECT TYPE

(75) Inventors: Thomas Callan McInally, Guildford (GB); Robert Keith John Withey, Guildford (GB); Simon David Meldrum, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,361

(22) Filed: Feb. 23, 2000

(30) Foreign Application Priority Data

Mar. 1, 1999 (GB) .............................. 9904675
Feb. 7, 2000 (GB) .............................. 0002770

(51) Int. Cl.[7] .................. G06F 15/177; G06F 7/00; G06F 9/44
(52) U.S. Cl. ..................... 713/1; 707/102; 709/315
(58) Field of Search ..................... 713/1; 707/102, 707/103 R, 104.1; 709/315

(56) References Cited

U.S. PATENT DOCUMENTS

| 5,287,447 A | * | 2/1994 | Miller et al. ................ 345/804 |
| 5,455,599 A | | 10/1995 | Cabral et al. ................ 345/133 |
| 5,710,896 A | | 1/1998 | Seidl ........................... 395/333 |
| 6,085,120 A | * | 7/2000 | Schwerdtfeger et al. ...... 700/90 |
| 6,106,569 A | * | 8/2000 | Bohrer et al. ................ 717/100 |
| 6,108,661 A | * | 8/2000 | Caron et al. ................. 707/102 |
| 6,216,152 B1 | | 4/2001 | Wong et al. ................. 709/203 |
| 6,438,742 B1 | * | 8/2002 | McCann et al. ............. 717/109 |

FOREIGN PATENT DOCUMENTS

| EP | 0 841 610 A2 | 5/1998 | ........... G06F/3/033 |
| JP | 0623615 A | * 8/1994 | ........... G06F/12/00 |

OTHER PUBLICATIONS

IBM, Non–Invasive Method for Adding Data Values to Existing Object Instances, Jul. 1, 1995, vol. 38, Issue 7, pp. 13–14.*

* cited by examiner

*Primary Examiner*—Thomas Lee
*Assistant Examiner*—Suresh K Suryawanshi
(74) *Attorney, Agent, or Firm*—Fitzpatrick, Cella, Harper & Scinto

(57) ABSTRACT

A computer application product 16 is produced by writing instructions which call functions and data from a tool kit product 4 and functions and data from a plug-in 22, 32. In order to enable object instances to be created with attributes other than those defined by the tool kit developer, each function from the tool kit 4 for creating an object instance has associated therewith an extension record 8-1 which can be amended to store data from which further instructions from a plug-in 22, 32 for creating an additional attribute for the object instance can be determined. When the application product is run, an object instance is created using instructions from the tool kit 4, and the extension record is checked to see if any additional attributes are to be created for the object instance and, if they are, the additional attribute(s) are created using instructions from the plug-in 22, 32.

47 Claims, 18 Drawing Sheets

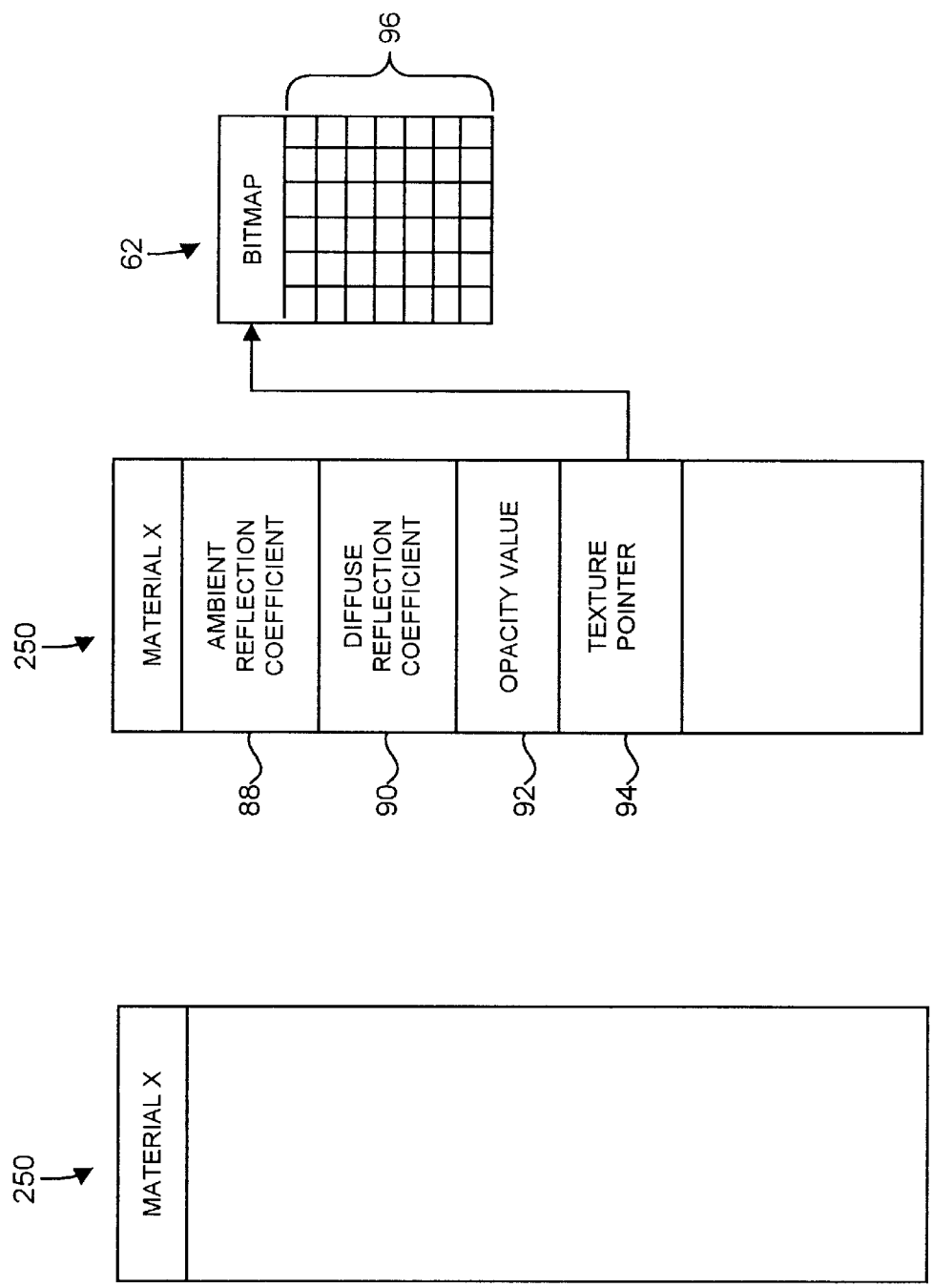

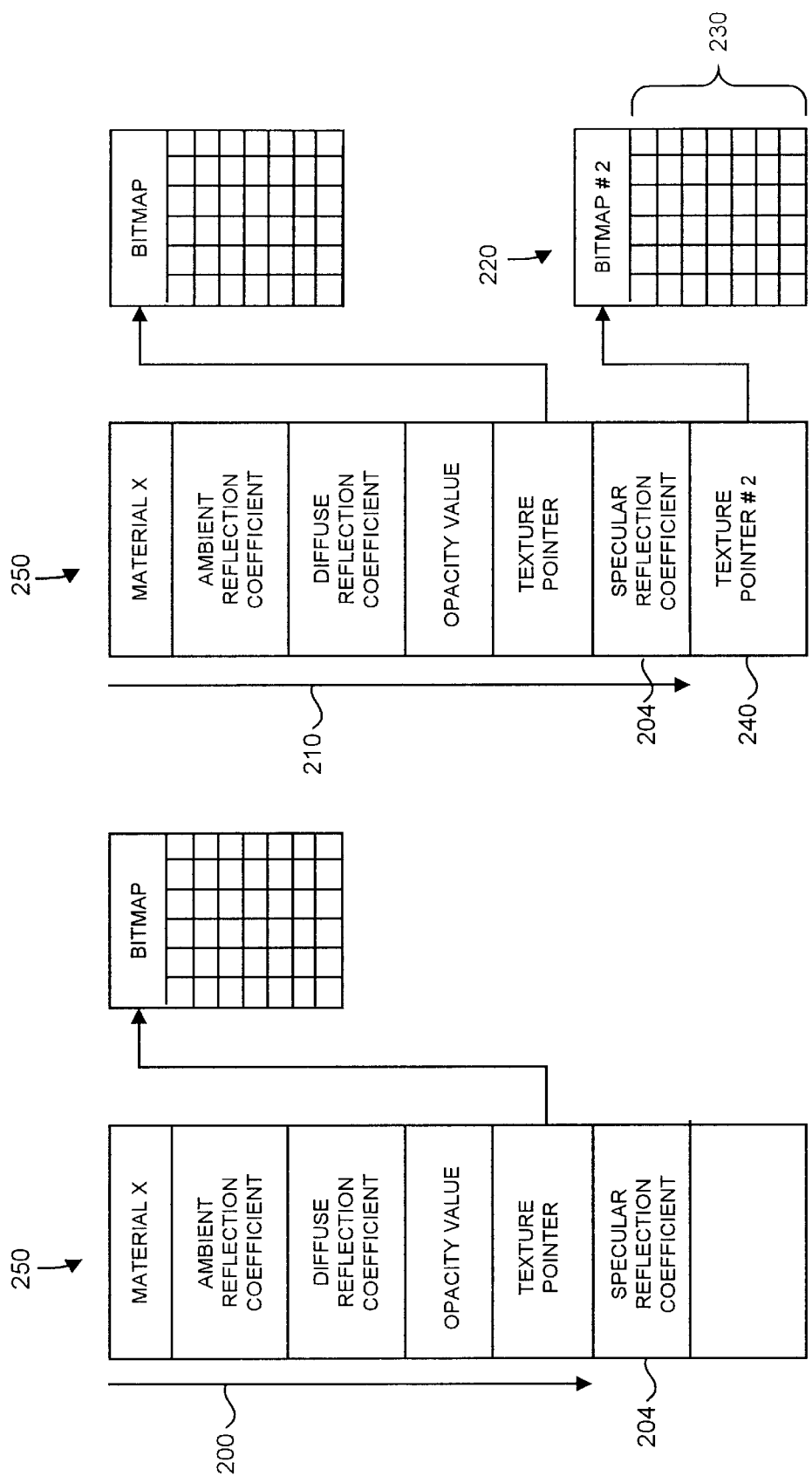

INSTRUCTIONS FOR CREATING AN EXTENSION DATA TO CREATE INSTANCES OF AN OBJECT WITH ADDITIONAL ATTRIBUTES WITHOUT CREATING A NEW OBJECT TYPE

BACKGROUND OF THE INVENTION

Field of the Invention

The present invention is concerned with the creation of objects in object-oriented computer programming, and the performing of processing using the created objects.

Object-oriented computer programs are widely used for many applications. As is well known, in object-oriented programs, each respective aspect of the application with which the program is concerned is modelled as an object type. For example, referring to the field of computer graphics by way of example, typical object types include physical entities such as "sphere", "cube" etc. or models of more complex entities, such as people, made up of "polygon" objects, "light source" objects to illuminate the physical entity objects and "camera" objects to view the illuminated physical entity objects. Each object has associated with it attributes predefined for the object type specifying characteristics of the object. For example, typical attributes for a "light source" object referred to above are intensity and position. Processing functions are performed on the objects using the values specified for the object attributes.

Software development "tool kit" products are often used to create object-oriented computer programs. A software development tool kit comprises a compiled software program (that is, machine code instructions) defining a library of functions and data to be used in the creation of object-oriented programs. The functions include a respective function to create an instance of each type of object having the predefined attributes of the object type, and functions to perform processing of the thus created objects. Using a software development tool kit, a programmer can therefore include functions from the library in the tool kit in his object-oriented program to create objects and perform processing functions thereon.

One problem that exists with software development tool kits, however, is that the attributes for each type of object are predetermined by the developer of the tool kit. That is, a user of a software development tool kit product can not change the attributes associated with an instance of an object which is created using an object creation function in the tool kit. This is because the tool kit comprises compiled software (that is, machine code instructions) and the user can therefore not change the tool kit. Thus, the user of a software development tool kit cannot include processing functions in his program which require processing to be performed on an attribute not defined for an object type by the tool kit developer.

The present invention has been made with this problem in mind.

SUMMARY OF THE INVENTION

According to the present invention, there is provided an apparatus or method for object-oriented processing, in which each set of instructions for creating an instance of an object type has associated therewith an extension record, in which data can be stored to cause the creation of the object instance with an additional attribute.

According to the present invention, there is provided a computer program product for the creation of an instance of an object type having first attribute instructions for creating at least one initial attribute for the object instance, second attribute instructions for creating at least one further attribute for the object instance, extension data defining the amount of memory required for an object instance having the at least one initial attribute and the at least one further attribute together with data from which the second attribute instructions can be determined, and instructions for causing a processing apparatus to operate so that an object instance is created by reading the extension data to determine the amount of memory to allocate for the object instance, using the first attribute instructions to define the at least one initial attribute, reading the extension data to determine the second attribute instructions, and using the second attribute instructions to define the at least one further attribute.

The first attribute instructions may be provided as a separate computer program product, together with extension data for the object type defining the amount of memory required for an object instance having the at least one initial attribute and instructions for causing the extension data to be amended, upon receipt of the necessary data, to include data from which the amount of memory necessary for an object instance having the at least one initial attribute and the at least one further attribute can be determined and data from which the second attribute instructions can be determined, this separate computer program product forming another aspect of the present invention.

The extension data may be amended when the final product is run by a user, or when the product is produced by an application product developer.

The second attribute instructions may be provided as a separate computer program product together with data from which the amount of memory for the at least one further attribute can be determined, which forms a further aspect of the present invention.

The present invention further provides a computer program product having first creation instructions for the creation of an instance of an object type having at least one initial attribute, extension data defining whether or not an instance of the object type is to have any further attributes, and if so, data from which second creation instructions to create at least one further attribute can be determined, and instructions for causing the creation of an object instance in dependence upon the first creation instructions and any further creation instructions defined in the extension data.

The first creation instructions may be provided together with initial extension data including a list for storing data from which further creation instructions can be determined as a separate computer program product, which forms a further aspect of the present invention.

The further creation instructions may also be provided along with data from which the size of the at least one further attribute can be determined as a separate computer program product, which also forms an aspect of the present invention.

An embodiment of the invention will now be described, by way of example only, with reference to the accompanying drawings, in which:

BRIEF DESCRIPTION OF THE DRAWINGS

FIGS. 11a, 11b, 11c and 11d schematically illustrate an example of the result of performing processing at steps

FIG. 15 shows the processing operations performed by the processing apparatus of the application product user in FIG. 1 to destroy an instance of an object type.

DETAILED DESCRIPTION OF THE PREFERRED EMBODIMENTS

Figure 1:
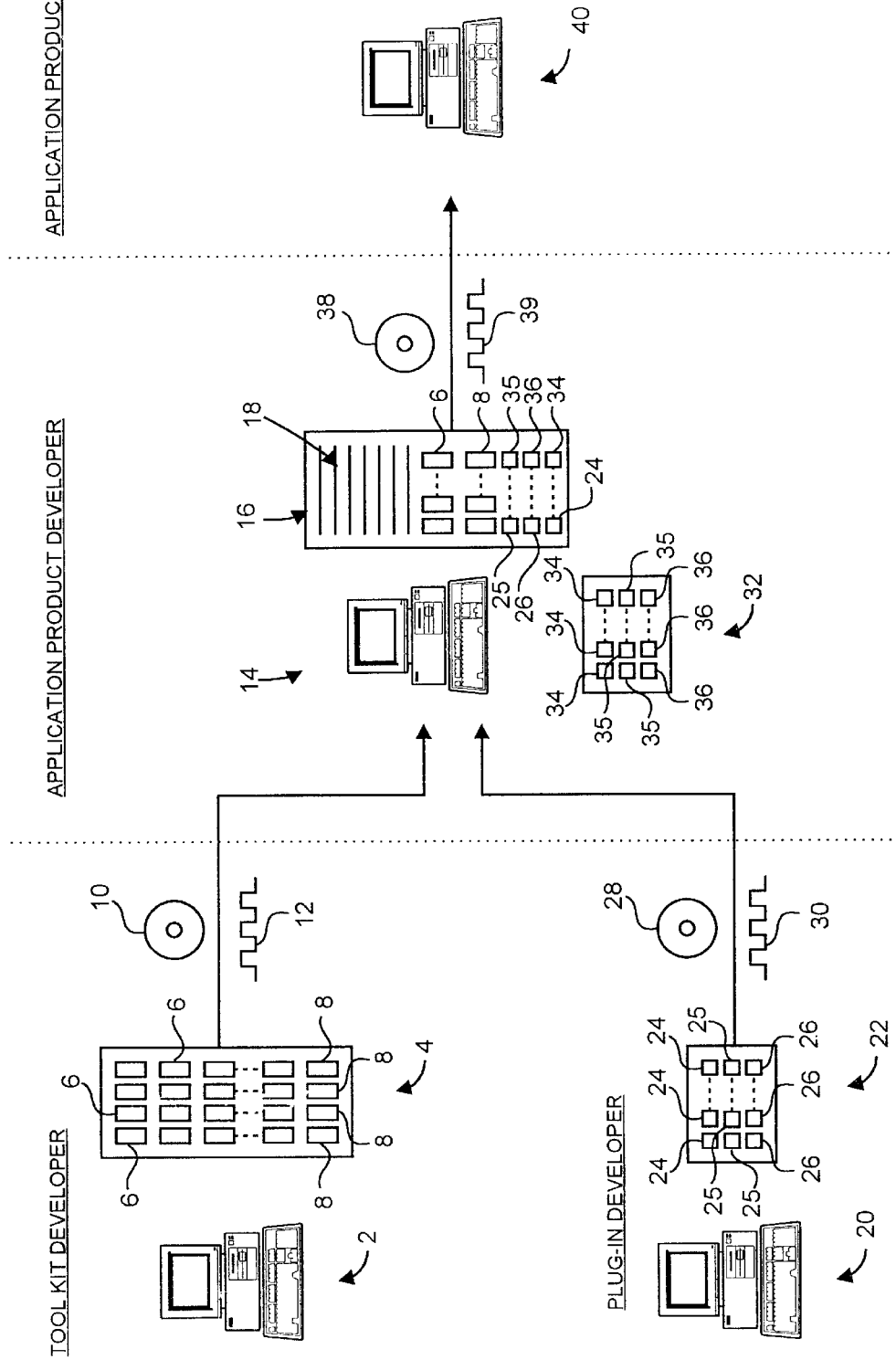
FIG. 1 schematically illustrates the generation of a software application product in an embodiment.

Referring to FIG. 1, the generation of a software application product is schematically illustrated. For the purpose of explanation, in this embodiment, the generation of an application product which comprises an interactive computer game using three-dimensional (3D) computer graphics will be described below, but the present invention is not limited to this application.

As schematically illustrated in FIG. 1, a tool kit developer uses a conventional programmable processing apparatus 2, such as a personal computer, to write software code defining a software development tool kit 4.

The software development tool kit 4 comprises a library of functions 6, each comprising software code instructions for causing a target type of programmable processing apparatus (that is, in this embodiment, the type of apparatus 40 of the end user who will run the application product that the tool kit 4 is used to develop) to perform the function. The tool kit 4 also includes a plurality of respective data records 8, each comprising data for use in developing an application product using the tool kit 4.

To assist understanding of the contents of tool kit 4, reference will be made in this embodiment to simplified 3D computer graphics, but the present invention is not limited to this application.

Figure 2:
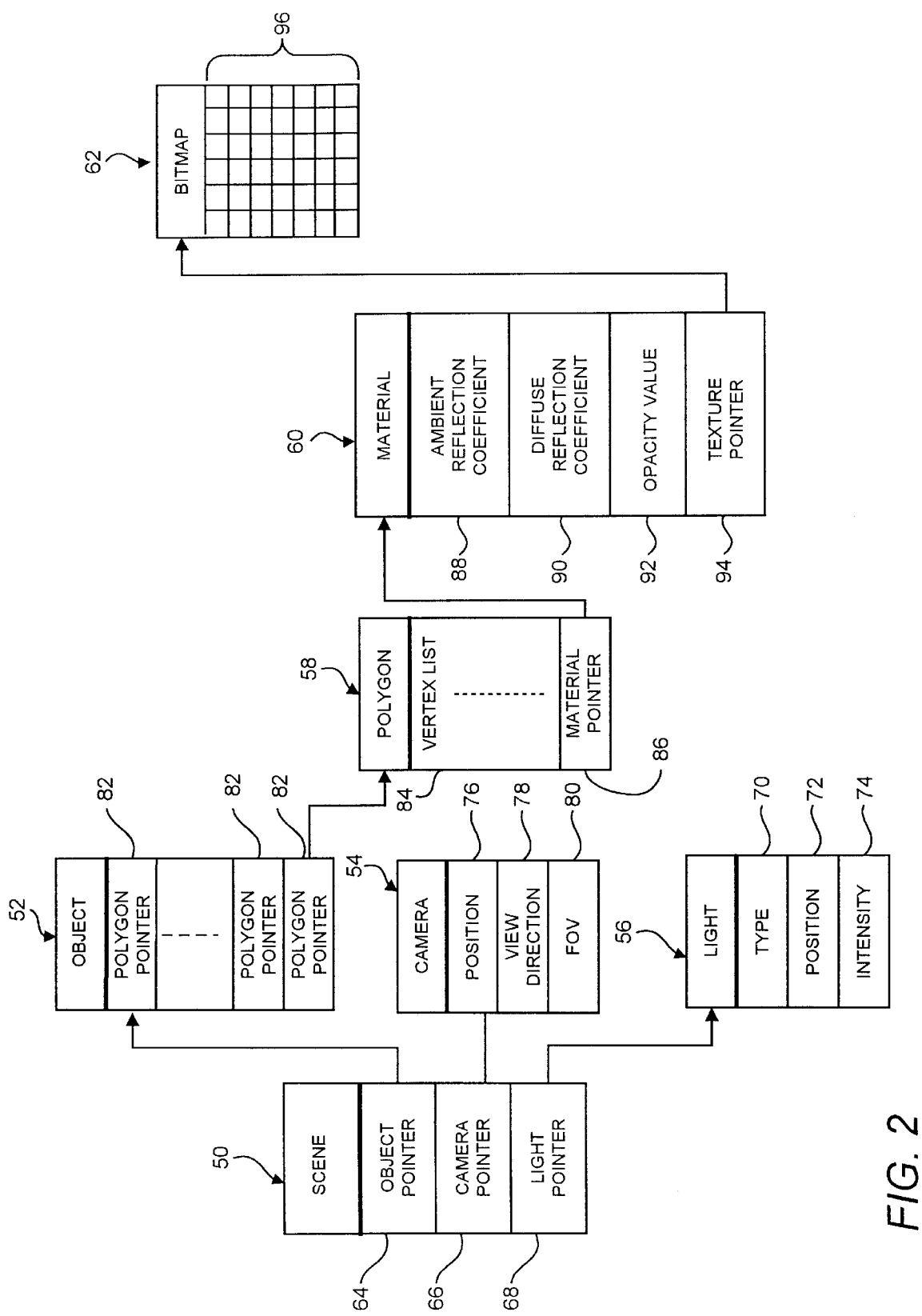
FIG. 2 illustrates object instances and associated attributes for a simplified computer graphics example.

Referring to FIG. 2, a plurality of object instances (in the sense of objects in object-oriented processing) 50, 52, 54, 56, 58, 60 and 62 are shown. Scene object instance 50 includes attribute data 64 which defines an object pointer to a physical entity object instance 52 in the scene, attribute data 66 defining a camera pointer to a camera object instance 54 to define a camera to view the scene, and attribute data 68 defining a light pointer to a light object instance 56 to define a light source to illuminate the scene.

Light source object instance 56 includes attribute data entries 70, 72 and 74 defining the type of light source, the position of the light source and the intensity of the light, respectively.

Camera object instance 54 includes attribute data entries 76, 78 and 80 defining the position of the camera, the view direction of the camera and the camera field of view (FOV), respectively.

Object instance 52 includes a plurality of attribute data entries 82, each of which comprises a polygon pointer to a polygon object instance 58.

Each polygon object instance 58 includes attribute data 84 defining the vertices of the polygon, and attribute data 86 comprising a material point to a material object instance 60, which defines the surface properties of the polygon.

Each material object instance 60 includes attribute data 88 defining the ambient reflection coefficient of the material, attribute data 90 defining the diffuse reflection coefficient of the material, attribute data 92 defining the opacity value of the material, and attribute data 94 comprising a texture pointer to a bitmap object instance 62.

Each bitmap object instance 62 includes data 96 defining a texture map comprising pixel data to be mapped onto the polygon defined by object instance 58 in a conventional manner.

Referring again to FIG. 1, the functions 6 in tool kit 4 include functions to create each of the object instances 50–62 described above with reference to FIG. 2, functions to duplicate and destroy each created object instance, and functions to perform processing on the object instances, for example to move an object, light source or camera in the scene, to display an image of the scene, etc.

The data records 8 in tool kit 4 include texture map data 96, etc.

After generating the software code defining tool kit 4, tool kit developer 4 passes the code through a compiler (not shown) to compile the code into machine code instructions. The machine code instructions are then sent to an application product developer on a storage device, such as disk 10 and/or as a signal 12 transmitted, for example, over the Internet.

The application product developer uses a programmable processing apparatus 14, such as a conventional personal computer, to store the tool kit 4 and to generate software code defining application product 16, which, in this embodiment is a computer game which uses computer graphics to interactively display images to a user.

The application product 16 contains software instructions 18 written by the application product developer. The software instructions include calls to functions 6 and data records 8 defined in tool kit 4, so that the functions 6 and data records 8 called by the instructions 18 become part of the application product 16 when it is compiled.

A plug-in developer uses a processing apparatus 20, such as a conventional PC, to generate software code defining a plug-in 22 comprising software code functions and data 24 to be used to interface the plug-in 22 to the tool kit 4, a library of functions 25 each comprising software code instructions for causing a predetermined target type of programmable processing apparatus (that is, in this embodiment, the type of apparatus 40 of the end user who will run the application product that the plug-in 22 is used to develop) to perform processing on an instance of an object, and a plurality of data records 26 for use in the application product.

As will be explained below, the plug-in 22 causes the functions 6 in tool kit 4 to create each instance of an object of a particular type so that the created object instance has an additional attribute defined by the plug-in. In addition, the functions 25 on plug-in 22 comprise functions for causing apparatus 40 to perform processing using the additional attribute. To illustrate this, an example will be given below in which the plug-in 22 causes a function 6 in the development tool kit 4 to create each material object instance 60 with an extra attribute which defines the specular reflection coefficient of the material.

The software code defining plug-in 22 is compiled by the plug-in developer and sent to the application product developer as machine code instructions stored on a storage device, such as disk 28, and/or as a signal 30 transmitted, for example, over the Internet.

The data defining the plug-in 22 is stored on processing apparatus 14, and causes the tool kit 4 to create each instance of the material object with an additional attribute defining the specular reflection coefficient of the material. In addition, the application product developer writes the software instructions 18 to include calls to the functions 25 and data records 26 defined on the plug-in 22. In this way, the instructions defining the functions 25 and data records 26 called by the instructions 18 become part of the application product 16 when it is compiled. The interface functions and data 24 also become part of the application product when it is complete, as will be described below.

In this embodiment, a further plug-in 32 is created by the application product developer.

Plug-in 32 includes software code functions and data 34 to be used to interface the plug-in 32 to the tool kit 4, a library of functions 35 each comprising software code instructions for causing a target type of programmable processing apparatus (that is, in this embodiment, the type of apparatus 40 of the end user who will run the application product that the plug-in 32 is used to develop) to perform processing on an instance of an object, and a plurality of data records 36 for use in the application product.

As will be explained below, plug-in 32 causes tool kit 4 to create each instance of an object of a predetermined type so that the instance of the object has an additional attribute. The functions 35 on plug-in 32 comprise functions for causing processing apparatus 40 to perform processing using the additional attribute, and can be included in the application product by including calls to the functions in the software instruction 18. An example will be described below in which plug-in 32 causes a function in software development tool kit 4 to create each instance of a material object 60 with an additional attribute specifying a second texture pointer to an instance of a second bitmap object storing second texture data. The second texture data, for example, defines pixel data simulating rust to be superimposed on the material texture defined by the pixel data 96 in bit map object instance 62.

The application product 16 is compiled into machine code instructions, which are delivered to the end user on a storage device, such as disk 38, on which the machine code instructions are recorded either directly or indirectly from another storage device, and/or as a signal 39 transmitted, for example, over the Internet. The compiled product contains data defining the software instructions 18, together with data defining the functions 6 and data records 8 called by software instructions 18 from tool kit 4, data defining the interface functions and data 24 and 34 from plug-ins 22 and 32, and data defining functions 25 and 35 and data records 26 and 36 called by software instructions 18 from plug-ins 22 and 32.

The end user of the application product installs the instructions received on disk 38 and/or as signal 39 on a processing apparatus 40, and runs the application. The type of processing apparatus 40 need not be the same as the type of processing apparatus 2, 14 or 20.

As will be explained below, when the application is run, objects created by functions 6 from tool kit 4 are created with additional attributes in accordance with instructions from plug-ins 22 and 32, and objects having the additional attributes are processed in accordance with functions 25 and 35 from plug-ins 22 and 32.

Figure 3:
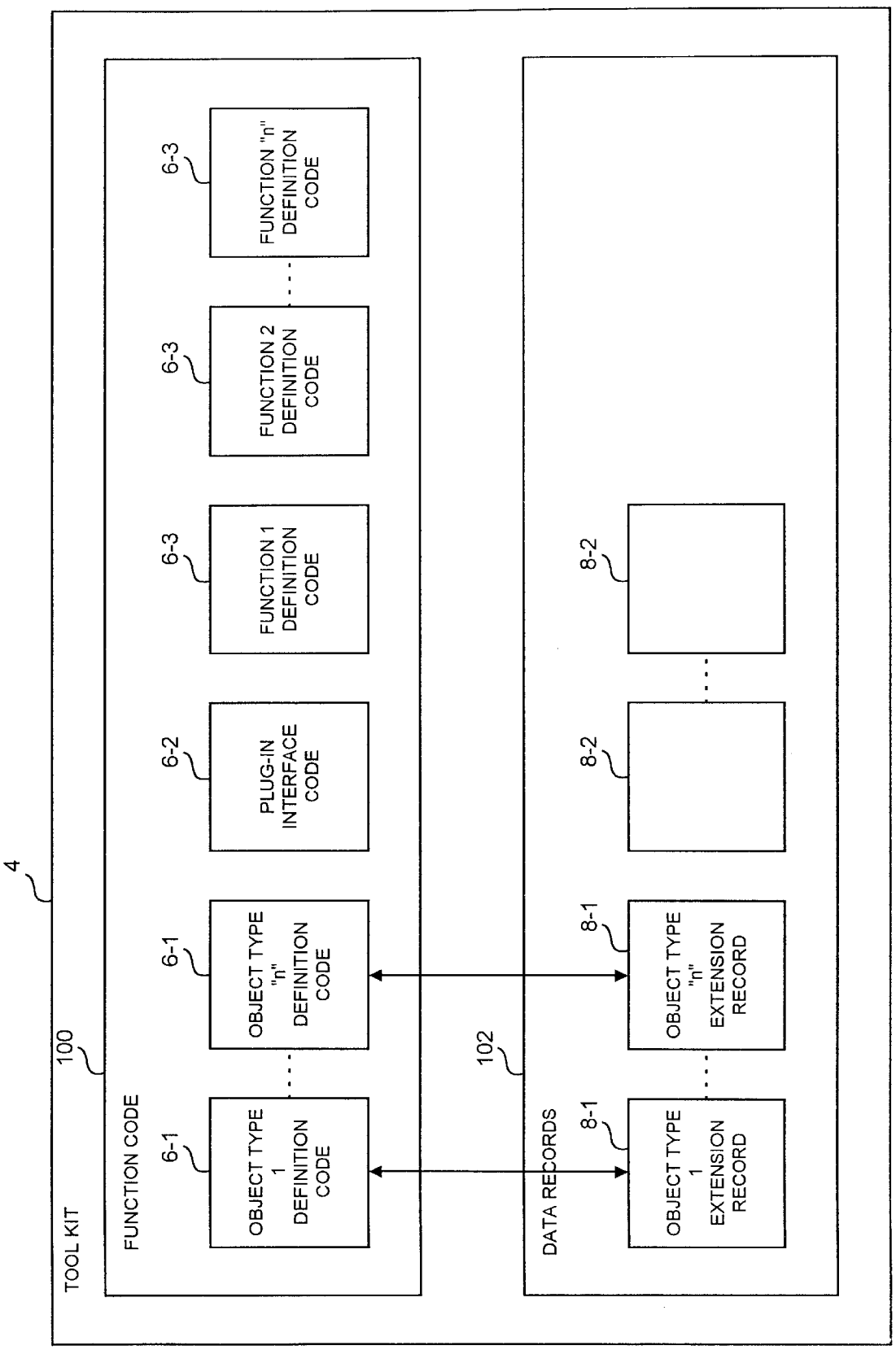
FIG. 3 schematically illustrates the contents of the software development tool kit in the embodiment of FIG. 1.

FIG. 3 shows in further detail the contents of the tool kit 4.

Referring to FIG. 3, the tool kit 4 comprises function code 100, which is made up of a plurality of blocks of code 6-1, 6-2 and 6-3, and data records 102, which comprise a plurality of respective records 8-1 and 8-2.

For each type of object to be created by tool kit 4, object type definition code 6-1 is included in the function code 100. Thus, object type definition code is included for each of the types of object instance described above with reference to FIG. 2.

Figure 4:
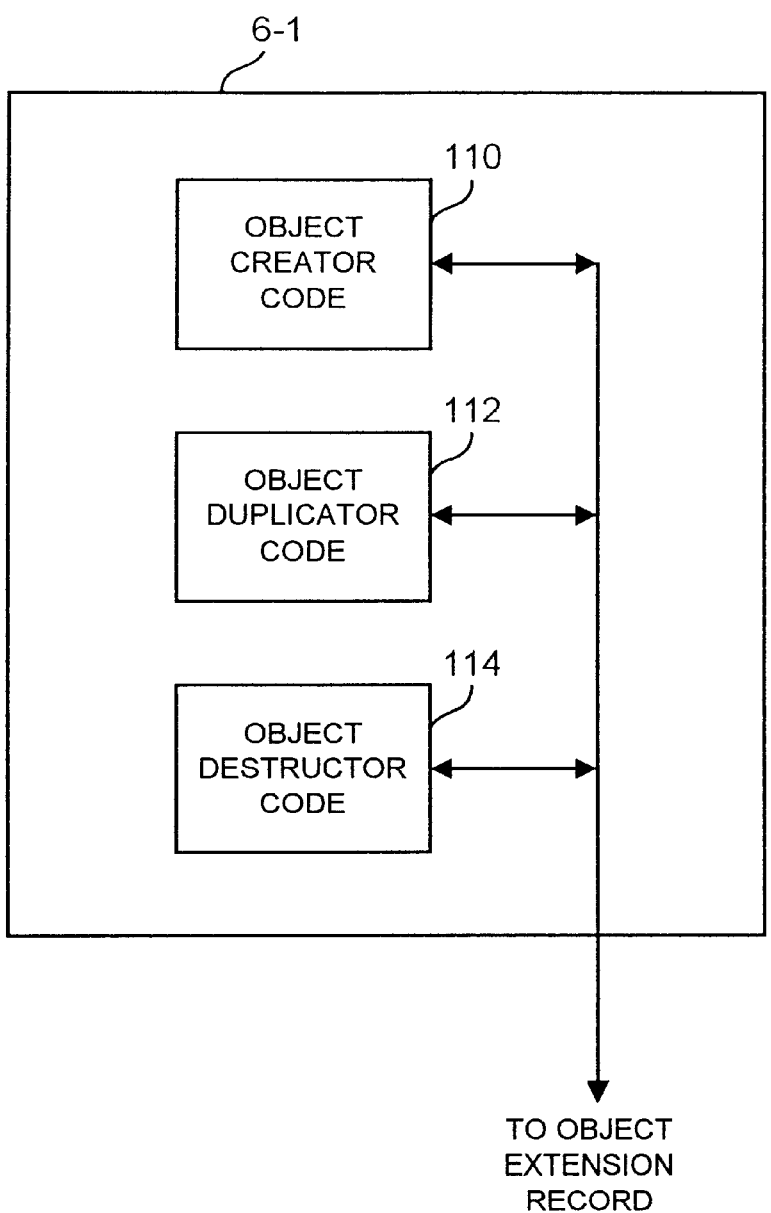
FIG. 4 schematically illustrates the contents of each block of object type definition code in the tool kit shown in FIG. 3.

FIG. 4 shows in more detail the contents of each block of object type definition code 6-1.

Referring to FIG. 4, the object type definition code for a given object type includes object creator code 110 for creating instances of the object type, object duplicator code 112 for duplicating an object instance created by the object creator code 110, and object destructor code 114 for destroying an object instance created by the object creator code 110 or object duplicator code 112.

Each block of object type definition code 6-1 is linked to a data record which comprises an extension record 8-1 for the object type with which the definition code is concerned. More particularly, the object creator code 110, the object duplicator code 112 and the object destructor code 114 each contain the address of the associated object type extension record 8-1.

Figure 5:
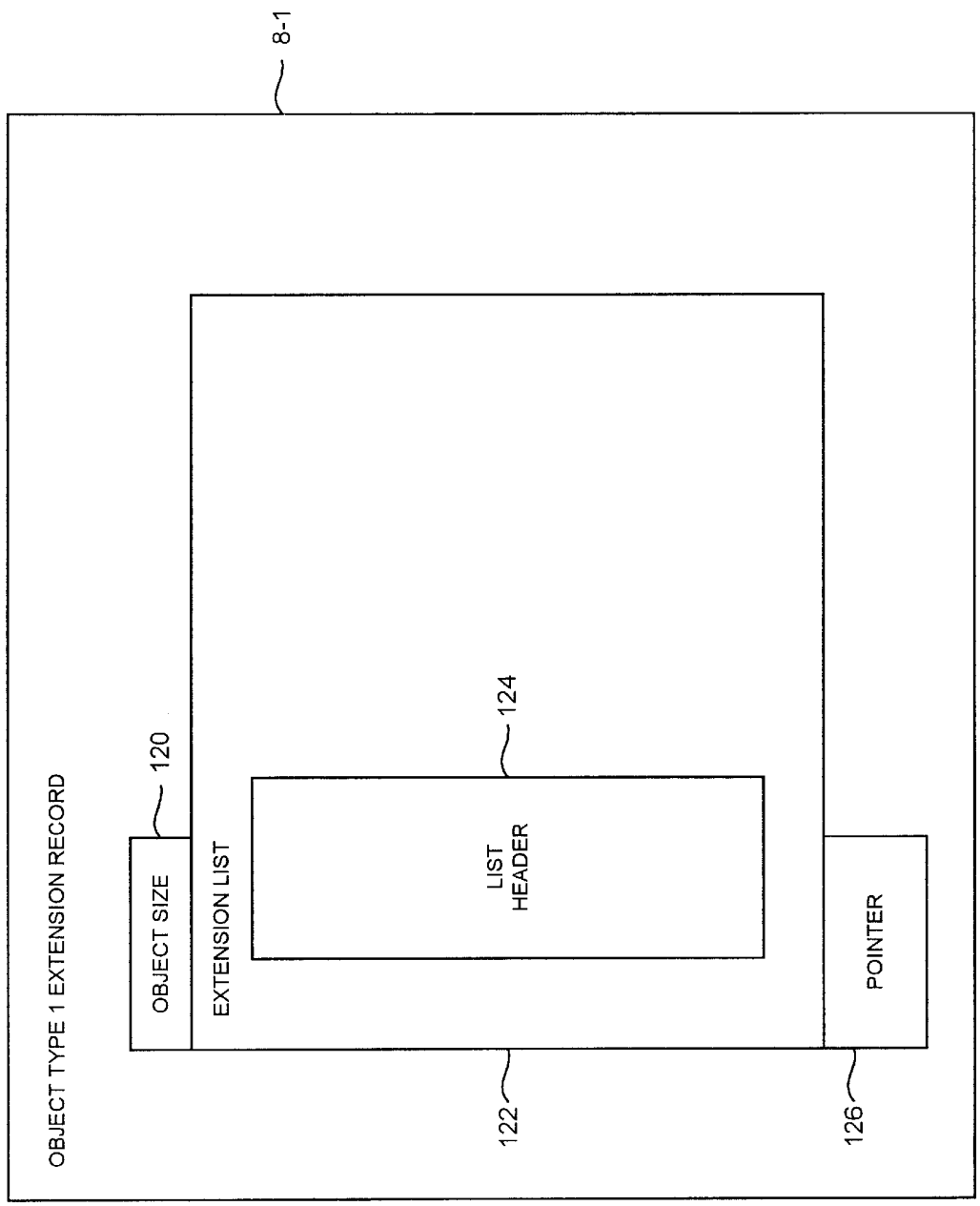
FIG. 5 schematically illustrates the contents of each object type extension record in the tool kit shown in FIG. 3.

FIG. 5 shows the contents of an object type extension. record 8-1 in the tool kit 4.

Referring to FIG. 5, each object type extension record 8-1 includes data 120 defining the amount of memory required to accommodate an object instance of the particular type with which the object type definition code and object extension record is concerned. Thus, for a material object 60, the object size data 120 defines the amount of memory required to accommodate a material object instance including the values of its attributes 88, 90, 92 and 94.

Each object type extension record 8-1 further includes an extension list 122, which, as will be described below, lists each extension made to the object type by a plug-in 22, 32. In this embodiment, in the tool kit 4 supplied by the tool kit developer, no extensions have been made by plug-ins, and accordingly the list 122 contains only a list header 124.

Each object type extension record 8-1 further includes a pointer 126, which points to the last extension in the list 122 added by a plug-in 22, 32. In the tool-kit 4, therefore, because no extensions have been added by a plug-in in this embodiment, the pointer 126 is not set.

Referring again to FIG. 3, the function code 100 in tool kit 4 further comprises plug-in interface code 6-2 for causing the processing apparatus 14 of the application product developer to perform processing functions to enable the tool kit 4 to interface with a plug-in 22, 32 (as will be described below).

The function code 100 further comprises a respective block of function definition code 6-3 for each processing function available within the tool kit 4. More particularly, each block of function definition code 6-3 comprises code for causing the processing apparatus 40 of the application product user to perform processing operations to carry out processing on an object instance when the computer game is run. Thus, for example, a block of function definition code 6-3 is provided for causing processing apparatus 40 to move a camera object instance 54 etc.

As described above, each block 110, 112, 114 and 6-3 of function code in tool kit 4 comprises code defining instructions for causing processing apparatus 40 of the application product user to perform specific processing operations when the computer game is run. To include each function in the application product, the application product developer writes the software instructions 18 to call the function code 110, 112, 114 and/or 6-3. The contents of each block of function code 110, 112, 114 and 6-3 called by the software instructions 18 are then compiled with the software instructions 18 to be included in the application product distributed on disk 38 or as signal 39.

The data records 102 within tool kit 4 further comprise respective records 8-2 defining data for use in the application product. Thus, for example, a data record 8-2 is provided defining texture map 96 for bitmap object instance 62.

Each data record 8-2 may be called by the software instructions 18 or by function code 110, 112, 114 or 6-3 in the tool kit 4. The data defining any record 8-2 which is called by the software instructions 18 or by a function from the tool kit 4 which is itself called by the software instructions 18 is compiled so that it is included in the machine code instructions defining the application product delivered on disk 38 or as signal 39.

Figure 6:
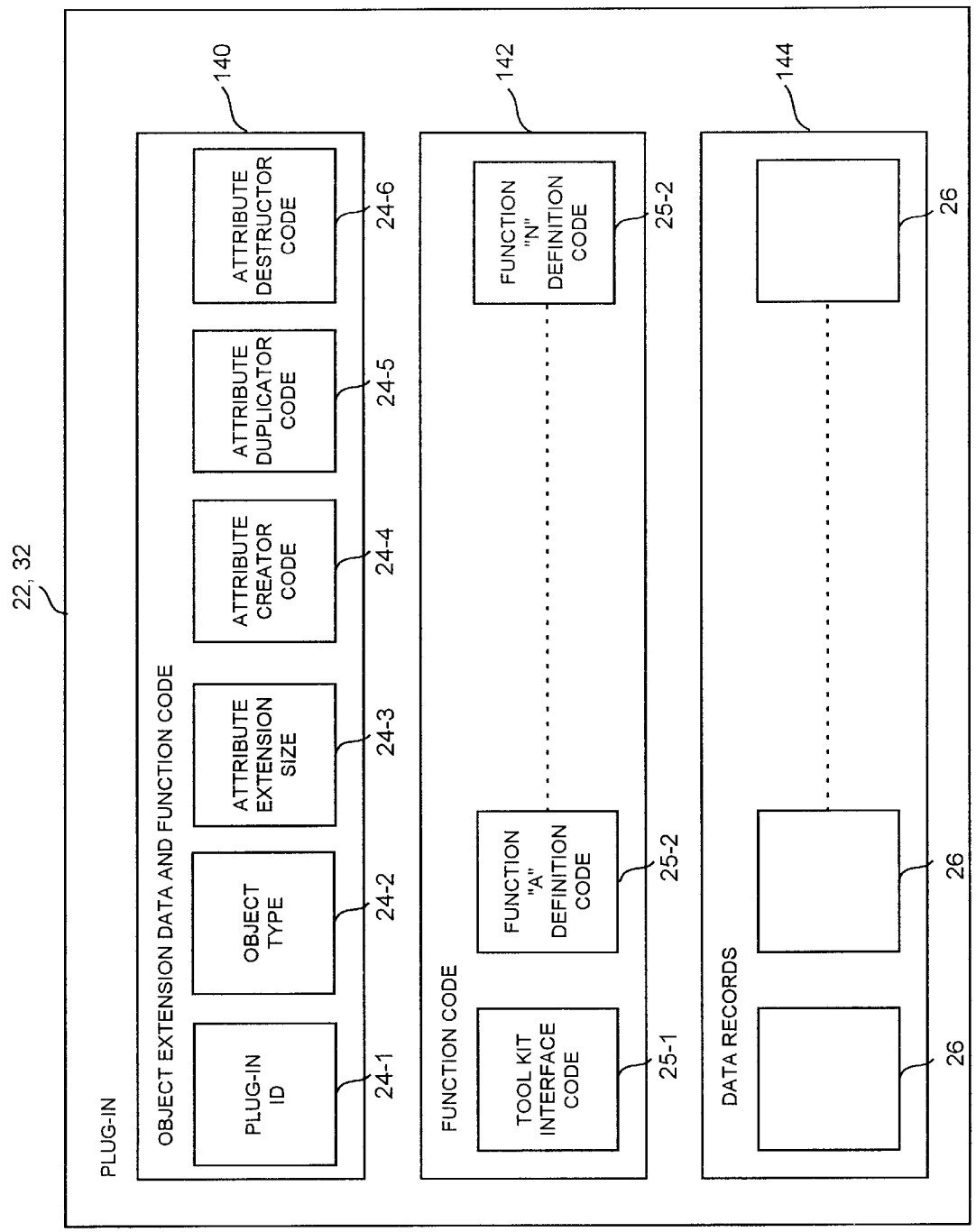
FIG. 6 schematically illustrates the contents of a plug-in the embodiment of FIG. 1.

FIG. 6 shows in more detail the contents of each plug-in 22, 32.

Referring to FIG. 6, each plug-in 22, 32 contains object extension data and function code 140 for causing tool kit 4 to create instances of a predetermined type of object with an additional attribute, and to duplicate and destroy such extended object instances.

More particularly, the object extension data and function code contains data 24-1 defining an identification number of the plug-in, and data 24-2 defining the type of object to which an attribute is to be added by the plug-in.

Thus, in the example of the present embodiment, the data 24-2 defines the material object type. Further included in the object extension data and function code 140 is data 24-3 defining the size of the attribute to be added by the plug-in 22, 32. That is, data 24-3 defines the amount of memory required to hold a value for the attribute added by the plug-in 22, 32.

Attribute creator code 24-4, attribute duplicator code 24-5 and attribute destructor code 24-6 is also provided in the object extension data and function code 140. As will be explained in more detail below, the attribute creator code 24-4 comprises code for causing the processing apparatus 40 of the application product user to create an additional attribute each time an instance of the object type defined by data 24-2 is created in accordance with instructions from tool kit 4. Similarly, attribute duplicator code 24-5 comprises code for causing processing apparatus 40 to duplicate the attribute created by the attribute creator code 24-4 whenever an instance of an object of the type defined by data 24-2 is duplicated using a function of the tool kit 4. Likewise, attribute destructor code 24-6 comprises code for causing processing apparatus 40 to destroy the additional attribute created by attribute creator code 24-4 or attribute duplicator code 24-5 whenever an instance of an object of the type defined in data 24-2 is destroyed using a function from tool kit 4.

Also contained in each plug-in 22, 32 is function code 142. As will be explained in more detail below, this function code includes tool kit interface code 25-1 which comprises code for causing the processing apparatus 14 of the application product developer to perform processing operations to allow the plug-in 22, 32 to interface with the tool kit 4 installed on the processing apparatus 14. The function code 142 further defines a library of processing functions offered by the plug-in, each of which makes use of the additional attribute added to instances of objects of the type defined in data 24-2 by the plug-in. A respective block of code 25-2 is provided for each function offered by the plug-in 22 or 32. That is, each block of code 25-2 comprises instructions for causing the processing apparatus 40 of the application product user to perform processing on an instance of an object of the type defined in 24-2.

Further included in plug-in 22, 32 is data 144, comprising respective data records 26. Each data record 26 comprises data to be used in the application product, such as texture map data etc.

Each block of code 25-2 or data record 26 can be called by processing instructions 18 written by the application product developer. Any block of code 25-2 or data record 26 which is called by the processing instructions 18 is compiled along with the processing instructions so that it is included in the machine code instructions delivered as the application product on disk 38 or as signal 39.

Figure 7:
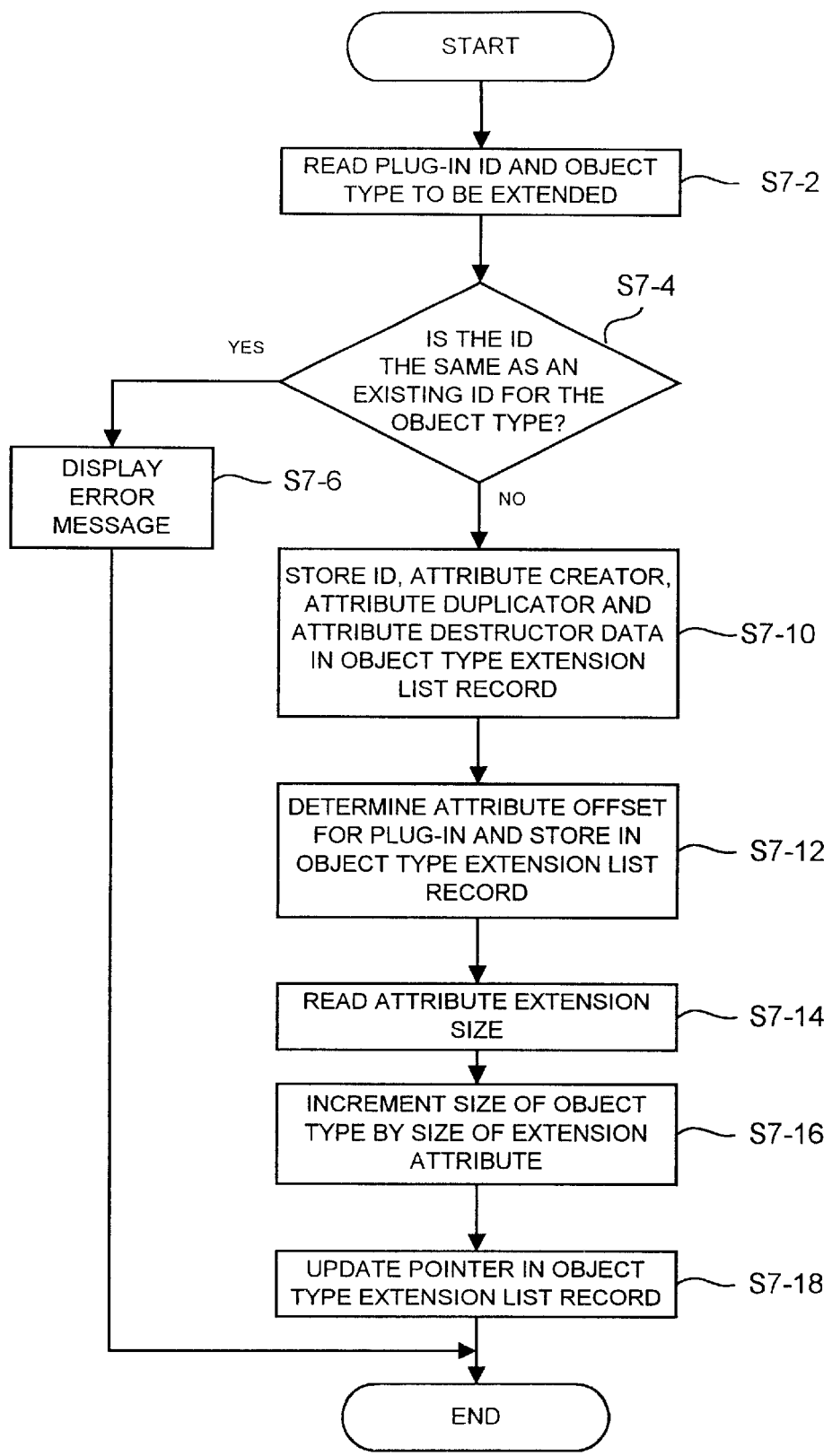
FIG. 7 shows the processing operations performed by the processing apparatus of the application product developer in FIG. 1 to register a plug-in with the software development tool kit.

FIG. 7 shows the processing operations which the plug-in interface code 6-2 in tool kit 4 and the tool kit interface code 25-1 in plug-in 22 or 32 cause the processing apparatus 14 of the application product developer to perform to register a plug-in with the tool kit 4 when the tool kit 4 and plug-in 22, 32 have been installed on the processing apparatus 14.

Referring to FIG. 7, at step S7-2, processing apparatus 14 reads data 24-1 from the plug-in defining the plug-in identification number and data 24-2 from the plug-in defining the type of object to which an attribute is to be added by the plug-in.

At step S7-4, processing apparatus 14 reads the object type extension record 8-1 in the tool kit 4 for the object type defined in data 24-2 read at step. S7-2, to determine if the identification number read at step S7-2 is the same as an existing identification number stored in the extension record 8-1. As described above with reference to FIG. 5, when no plug-in has previously been registered with the tool-kit 4, the extension record 8-1 for each object type does not include any plug-in identification number. On the other hand, as will be explained below, when a plug-in is registered with the tool kit 4, the identification number of the plug-in is stored in the extension record 8-1 for the type of object for which the plug-in adds an attribute.

If it is determined at step S7-4 that the identification number is the same as an existing identification number for the object type, then, at step S7-6, processing apparatus 14 displays an error message to the application product developer.

Figure 8:
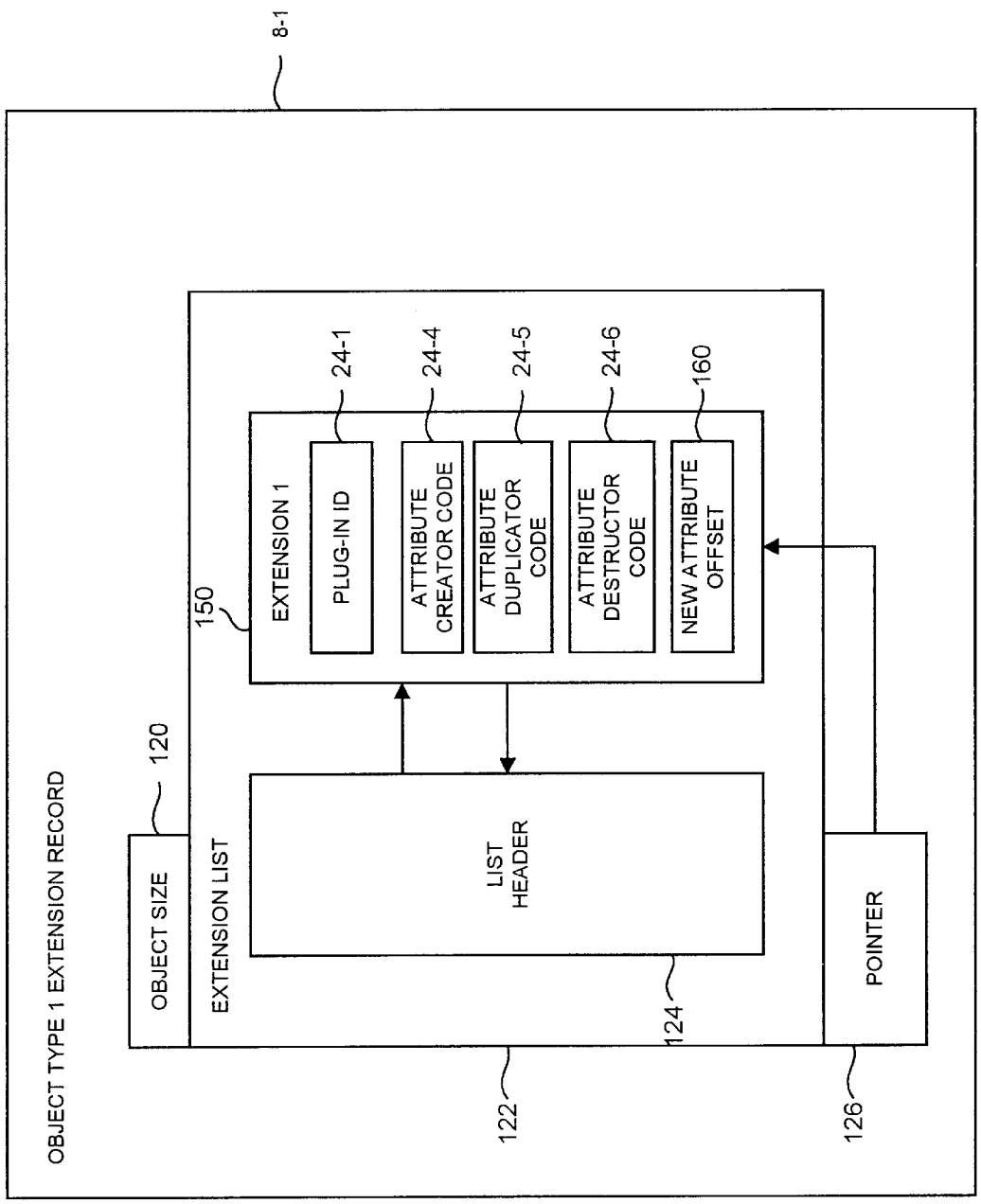
FIGS. 8 and 9 schematically illustrate the processing performed at steps S7-10 to S7-18 in FIG. 7.

On the other hand, if it is determined at step S7-4 that the plug-in identification number is not the same as an existing identification number for the object type, then, as schematically illustrated in FIG. 8, at step S7-10, processing apparatus creates an extension entry 150 for the plug-in as a doubly-linked entry in the extension list 122 at a memory location determined from the pointer 126 (which, as described above, points to the last extension entry in the extension list 122). The data 24-1 from the plug-in defining the identification of the plug-in is stored in the extension entry 150, together with the attribute creator code 24-4, the attribute duplicator code 24-5 and the attribute destructor code 24-6 from the plug-in.

At step S7-12, processing apparatus 14 determines the off-set that the new attribute added by the plug-in will have in each instance of the object type, the off-set defining the position from the start of the data defining the object instance at which the data for the new attribute is stored. In this embodiment, processing apparatus 14 determines the off-set by setting the off-set equal to the object size stored in object size data 120 in the extension record 8-1 (since the size defined in data 120 comprises the amount of data currently required for an instance of the object type, including any previous extensions which have been added by plug-ins, and therefore the data defining the new attribute added by the plug-in will be stored for the object instance after this data). The attribute off-set determined by processing apparatus 14 is stored as attribute off-set data 160 in the extension entry 150.

At step S7-14, processing apparatus 14 reads the attribute extension size data 24-3 from the plug-in defining the amount of memory required to store the new attribute to be added by the plug-in in an object instance.

At step S7-16, processing apparatus 14 adds the size defined by the data 24-3 read at step S7-14 to the object size defined in data 120 stored in the extension record 8-1. The resulting size, which replaces the previous size stored in data 120, therefore defines the amount of memory required to create an instance of the object type including the new attribute added by the plug-in. The new size therefore also defines the attribute off-set for the next extension added by a plug-in to the object type.

At step S7-18, processing apparatus 14 updates the pointer 126 to point to the extension entry 150, which is now the last extension entry in the extension list 122.

Figure 9:
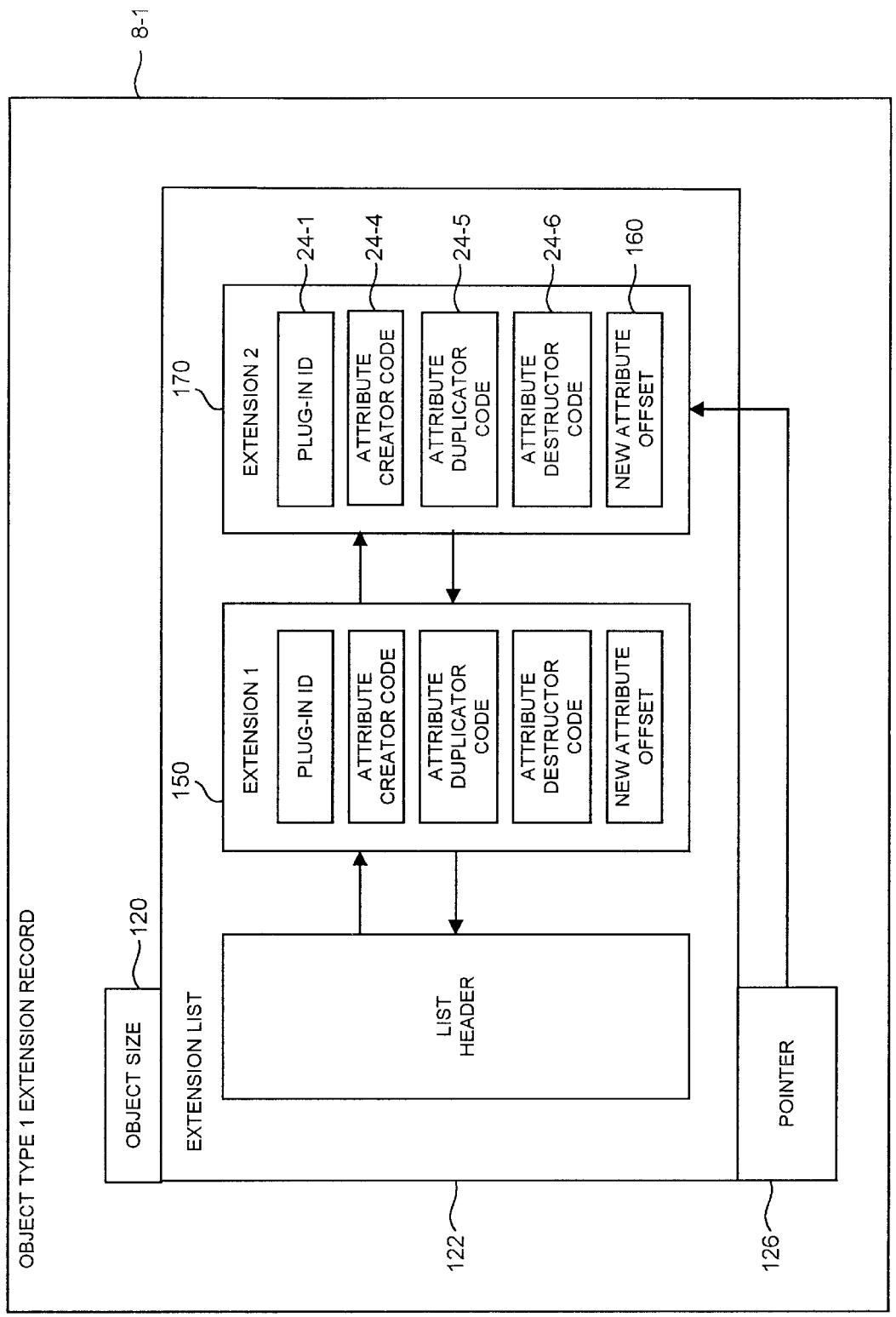

Referring to FIG. 9, the registration of the second plug-in 32 with the tool kit 4 is schematically illustrated. The registration of the second plug-in 32 (and any additional plug-ins) is performed using the processing steps previously described with reference to FIG. 7. A second extension entry 170 in the extension list 122 is created, which is doubly-linked in a conventional manner to the first extension entry 150. The object size 120 is updated to define the amount of memory required to store data in an instance of the object type created with the attribute added by plug-in 22 and the attribute added by plug-in 32, and the pointer 126 is updated to point to the final extension entry in the list 122, this being the entry 170.

Figure 10:
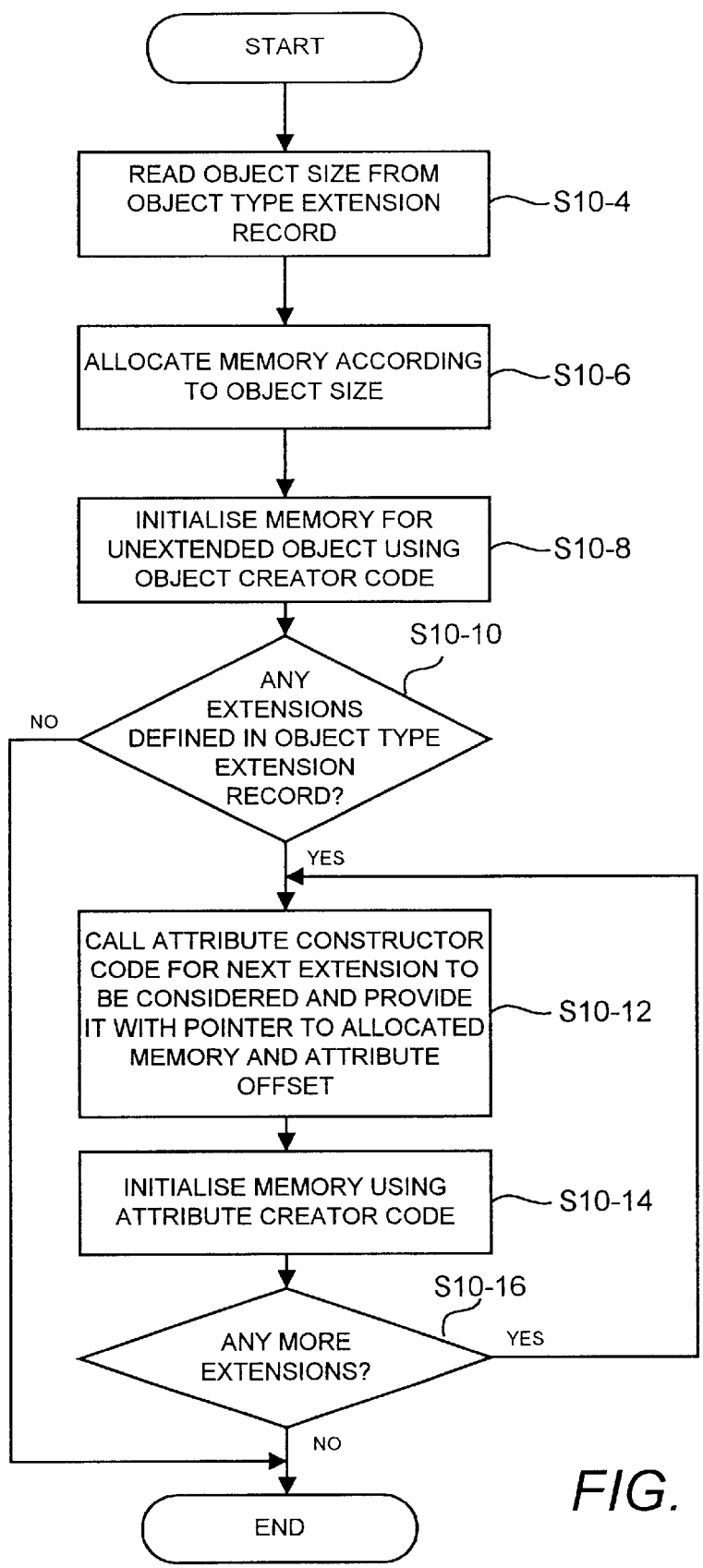
FIG. 10 shows the processing operations performed by the processing apparatus of the application product user in FIG. 1 to create a instance of an object type.

FIG. 10 shows the processing operations performed by the processing apparatus 40 of the application product user whenever the application product (computer game in this embodiment) is run and the software instructions 18 therein call object creator code 110 for a given type of object from the tool kit 4 to create an instance of the given object type (whether or not a plug-in was registered for the object type by the application product developer).

Referring to FIG. 10, at step S10-4, object creator code 110 causes processing apparatus 40 to read the data 120 from the extension record 8-1 for the given object type defining the amount of memory required to store an instance of the object type.

At step S10-6, object creator code 110 causes processing apparatus 40 to allocate memory within apparatus 40 for the object instance equal to the size read at step S10-4. This is schematically illustrated in FIG. 11a for an instance 250 of a material type object.

At step S10-8, processing apparatus 40 initialises the memory allocated at step S10-6 by performing processing operations defined by the object creator code 110 in the tool kit 4. This creates an instance of the object type in accordance with the original instructions from the tool kit developer. Thus, referring to FIG. 11b, for the example of the material object instance 250, the memory allocated at step S10-6 is initialised at step S10-8 to store attributes 88, 90, 92 and 94 defining an ambient reflection coefficient, a diffuse reflection coefficient, an opacity value and a texture pointer. In addition, in this example, the initialisation defined by object creator code 110 in the tool kit 4 causes a bitmap object instance 62 to be created with texture data 96 stored therein.

At step S10-10, object creator code 110 causes processing apparatus 40 to read the extension record 8-1 for the given object type and determine therefrom whether any extensions are defined by plug-ins for the object type (that is, whether any extension entries 150, 170 exist in the extension list 122).

If it is determined at step S10-10 that no extensions are defined in the object type extension record 8-1, then the processing operations to create an instance of the object type are complete. Accordingly, if no extensions are defined in the object type extension record 8-1, an instance of the object type is created in accordance with the original instructions of the tool kit developer without any additional attributes.

On the other hand, if it is determined at step S10-10 that an extension is defined in the object type extension record 8-1, then, at step S10-12, object creator code 110 causes the processing apparatus 40 to locate the attribute creator code 24-4 in the first extension entry 150 in the extension list 122 and to provide it with a pointer to the memory allocated at step S10-6 and the attribute offset read from the data 160 defined in the extension entry 150.

At step S10-14, processing apparatus 40 performs processing operations defined by the attribute creator code 24-4 to initialise part of the memory allocated at step S10-6 to store data defining the additional attribute to be added by the plug-in corresponding to the extension entry 150. More particularly, referring to FIG. 11c, the attribute offset data 160 defines the offset 200 from the beginning of the memory allocated at step S10-6 to the part of the memory where data defining the new attribute is to be added. At step S10-14, therefore, processing apparatus 40 initialises the memory starting at the location defined by offset data 160 to add data defining the new attribute 204 (in this example a specular reflection coefficient for the material) to the instance of the object. Depending upon the instructions defined in the attribute creator code 24-4, the value stored for the specular reflection coefficient is a default value or the attribute creator code 24-4 causes the processing apparatus 40 to request a user to input a value, and to store the input value.

At step S10-16, object creator code 110 causes processing apparatus 40 to read the extension list 122 within the extension record 8-1 for the object type to determine whether there are any more extension entries 150, 170. Additional extension entries are identified using the double linkage between the entries in the list 122 in a forward direction.

Steps S10-12 to S10-16 are repeated until no further extension entries 150, 170 remain to be processed in the list 122.

Referring to FIG. 11d (and also FIG. 9), for the example being considered in the present embodiment, when step S10-12 is performed for the second time, the attribute creator code 24-4 for the second extension entry 170 is provided with a pointer to the memory allocated at step S10-6 together with data 160 from entry 170 defining the offset 210. When step S10-14 is performed, the attribute creator code 24-4 from the extension entry 170 causes processing apparatus 40 to create a second bitmap object instance 220 storing texture data 230, and to store data defining an additional attribute 240 in the material object instance 250, the additional attribute 240 comprising a second texture pointer to the second bitmap object instance 220.

Figure 12:
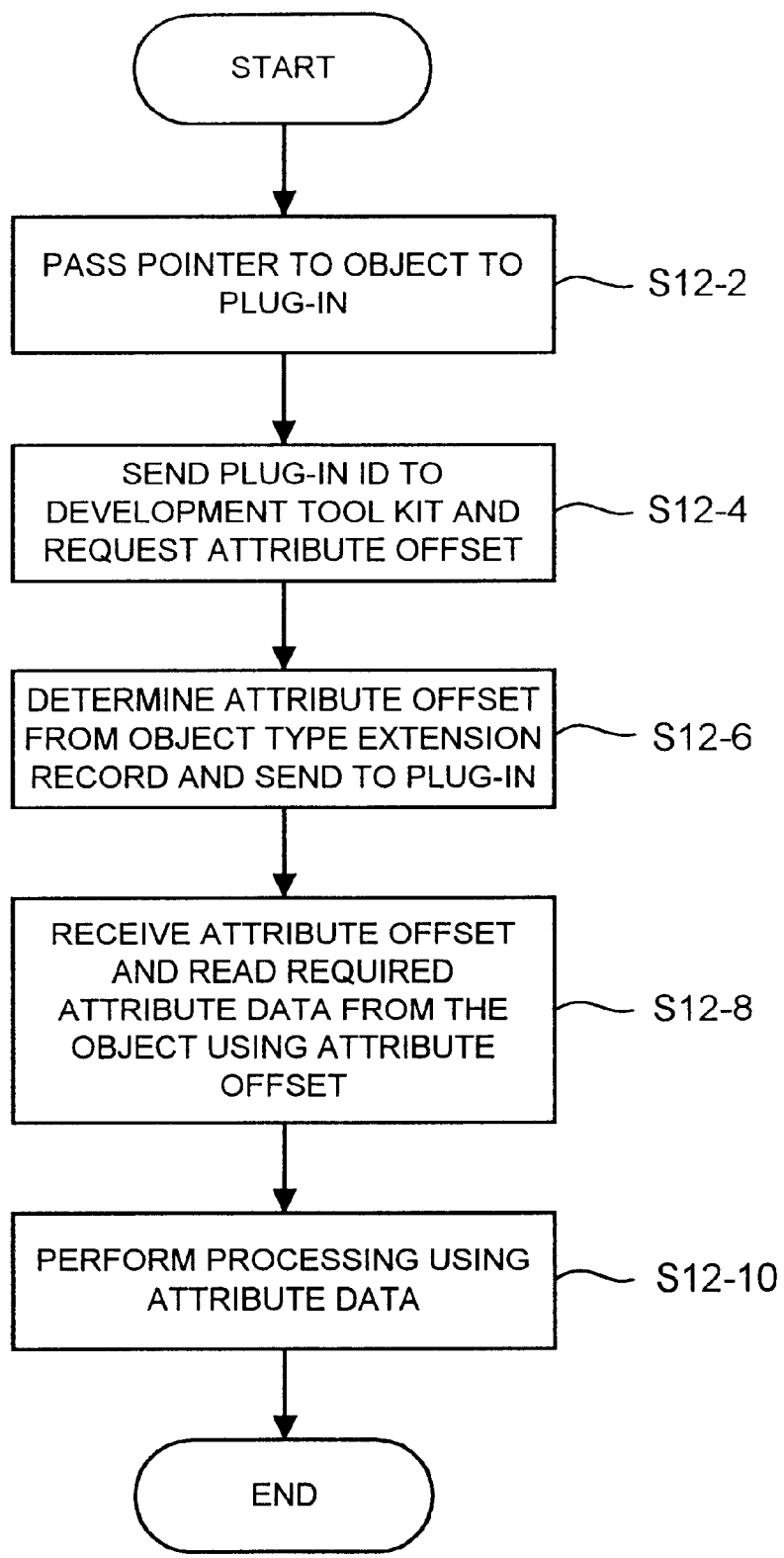
FIG. 12 shows the processing operations performed by the processing apparatus of the application product user in FIG. 1 to perform processing on an instance of an object created with an additional attribute using a plug-in FIG. 13 shows the processing operations performed by the processing apparatus of the application product user in FIG. 1 to duplicate an instance of an object type.

FIG. 12 shows the processing operations performed by apparatus 40 to carry out processing on an object instance having an attribute added by a plug-in 22, 32 in accordance with processing instructions defined by a block of function definition code 25-2 in the plug-in. Thus, by way of example, FIG. 12 illustrates the processing operations to calculate specular lighting values for a material object, the material object having an attribute 204 added by plug-in 22 to define the specular reflection coefficient, and the processing to calculate the specular reflection values being defined by function definition code 25-2 from plug-in 22.

Referring to FIG. 12, when the software instructions 18 in the application product call a processing function defined by function definition code 25-2 in a plug-in, processing apparatus 40 passes a pointer defining the object instance on which processing operations are to be performed to the function definition code 25-2.

At step S12-4, upon receipt of the pointer, function definition code 25-2 calls the tool kit interface code 25-1 from the plug-in to cause processing apparatus 40 to send the data 24-1 defining the plug-in ID to the development tool kit 4 and to request the offset for the attribute added by the plug-in from the tool kit 4.

At step S12-6, upon receiving the request, the plug-in interface code 6-2 in tool kit 4 causes processing apparatus 40 to read the extension list 122 in the object type extension record 8-1 to determine the attribute offset (stored as data 160 in an extension entry 150, 170) for the plug-in having the received identification. The attribute offset is then returned to the requesting plug-in.

At step S12-8, upon receipt of the attribute offset, tool kit interface code 25-1 causes processing apparatus 40 to read the required attribute data from the object instance defined by the pointer received at step S12-2 from the location defined by the attribute offset. More particularly, referring to FIG. 11c by way of example, the location of the data defining the attribute added by the plug-in is defined by the attribute offset 200. Accordingly, at step S12-8, processing apparatus 40 locates and reads the data defining the attribute added by the plug-in.

At step S12-10, processing on the attribute data read at step S12-8 is performed by processing apparatus 40 in accordance with the function definition code 25-2. More particularly, in the example of this embodiment, function definition code 25-2 causes processing apparatus 40 to calculate specular lighting values using the specular reflection coefficient 204 of the material object instance 60.

In accordance with the processing steps described above, the required attribute data added to an instance of an object by the plug-in is identified and used in processing in accordance with a processing function defined by the plug-in.

Figure 13:
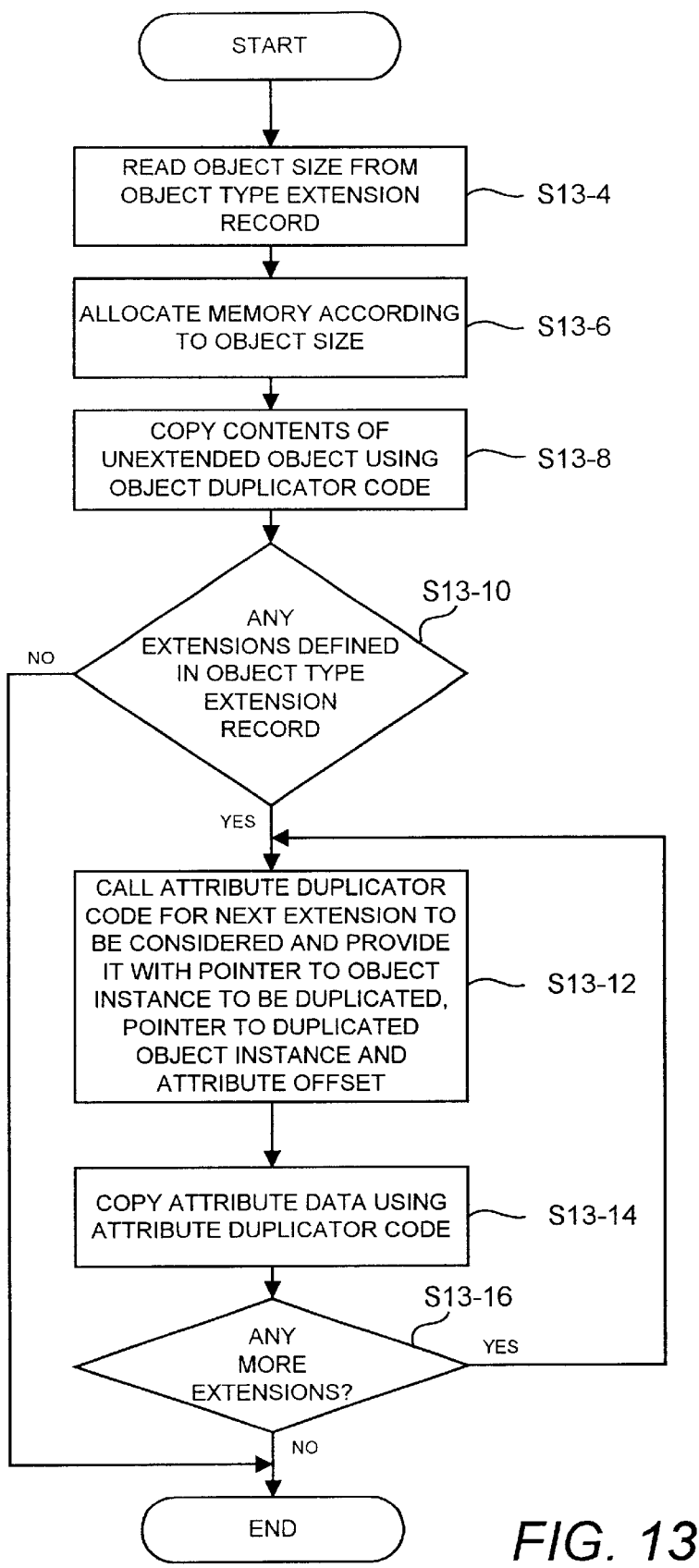

FIG. 13 shows the processing operations performed by the processing apparatus 40 of the application product user whenever the application product is run and the software instructions 18 therein call object duplicator code 112 for a given type of object from the tool kit 4 to duplicate an instance of the given object type.

Referring to FIG. 13, at step S13-4, object duplicator code 112 causes processing apparatus 40 to read the object size data 120 from the extension record 8-1 for the given object type. As noted above, the object size data 120 defines the amount of memory required to store data defining an instance of the object (including any extensions).

At step S13-6, object duplicator code 112 causes processing apparatus 40 to allocate an amount of memory for the duplicated object instance equal to the size read at step S13-4.

At step S13-8, object duplicator code 112 causes processing apparatus 40 to copy the data defining the attributes in the instance of the object being copied which were not added by a plug-in (that is, the attributes in the object instance created by the object creator code 110 from tool kit 4) to the memory allocated at step S13-6. The result of performing step S13-8 is illustrated in FIG. 14a.

Figure 14A:
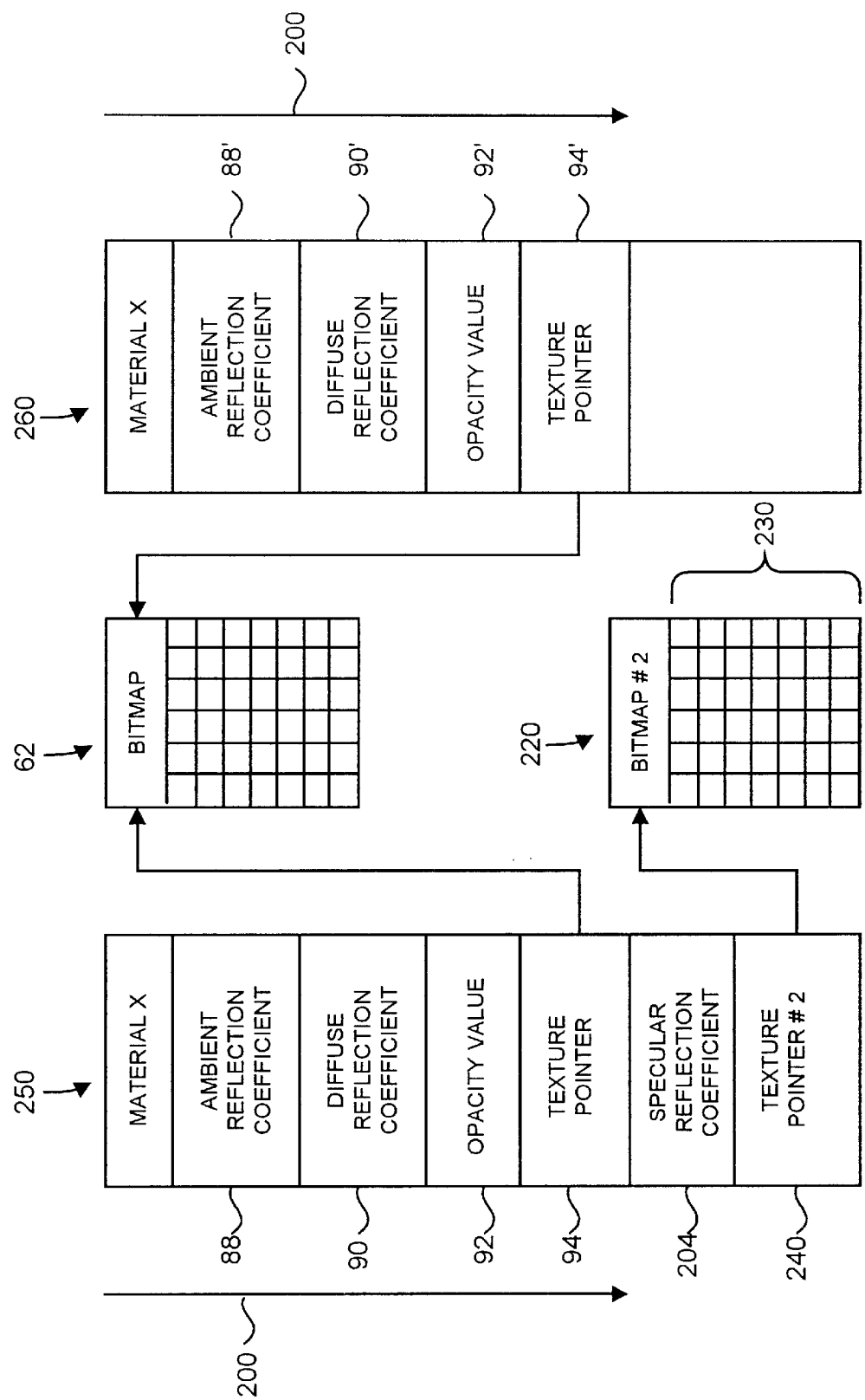
FIGS. 14a and 14b schematically illustrate an example of the result of performing the processing at steps S13-8 to S13-16 in FIG. 13.

Referring to FIG. 14a, the object instance being copied comprises instance 250 of a material object. As described previously, attributes 88, 90, 92 and 94 defining respectively the ambient reflection coefficient, diffuse reflection coefficient, opacity value and texture pointer to a bitmap object instance 62 were defined in accordance with the object creator code 110 in the tool kit 4. The attribute data 204 defining a specular reflection coefficient was added to the object instance 250 by the attribute creator code 24-4 in plug-in 22, and the attribute data 240 defining the texture pointer to a second bitmap object instance 220 was added to the object instance 250 by the attribute creator code 24-4 in plug-in 32. When step S13-8 is performed, the attribute data 88, 90, 92 and 94 from the object instance 250 is copied to the new object instance 260, this being the attribute data added by the object creator code 110 of the tool kit 4 and not attribute data added by a plug-in. As shown in FIG. 14a, the texture pointer 94' in the duplicated object instance 260 points to the same bitmap object instance 62 as the texture pointer 94 from the first object instance 250.

Referring again to FIG. 13, at step S13-10, object duplicator code 112 causes processing apparatus 40 to read the extension list 122 in the extension record 8-1 for the given object type to determine whether any extensions are defined for the object type (that is, whether any extension entries 150, 170 exist in the extension list 122).

If it is determined at step S13-10 that no extensions are defined for the object type, then the duplication of the object instance is complete.

On the other hand, if it is determined at step S13-10 that an extension for the given object type does exist, then, at step S13-12, object duplicator code 112 causes processing apparatus 40 to call the attribute duplicator code 24-5 stored in the first extension entry 150 in the extension list 122 of the extension record 8-1 and to provide the attribute duplicator code 24-5 with a pointer defining the location of the object instance to be duplicated (250 in FIG. 14*a*), a pointer defining the location of the duplicated object instance (260 in FIG. 14*a*) and the attribute offset data 160 from the extension entry 150 defining both the start of the attribute data in the object instance 250 to be duplicated and the location in the duplicated object instance 260 to which the attribute data is to be copied. More particularly, referring to FIG. 14*a*, attribute offset 200 defines the start of the attribute data 204 defining the specular reflection coefficient in object instance 250 and likewise defines the memory start location to which the attribute data is to be copied in object instance 260.

At step S13-14, processing apparatus 40 copies the attribute data defining the attribute added by the plug-in 22 from the object instance 250 being duplicated to the duplicated object instance 260 by performing processing in accordance with the attribute duplicator code 24-5 from the plug-in 22, which is stored in the extension record 8-1. Thus, processing apparatus 40 reads attribute data starting from the position defined by the attribute offset 200, and copies the read data to a position in the duplicated object instance defined by the attribute offset.

Figure 14B:
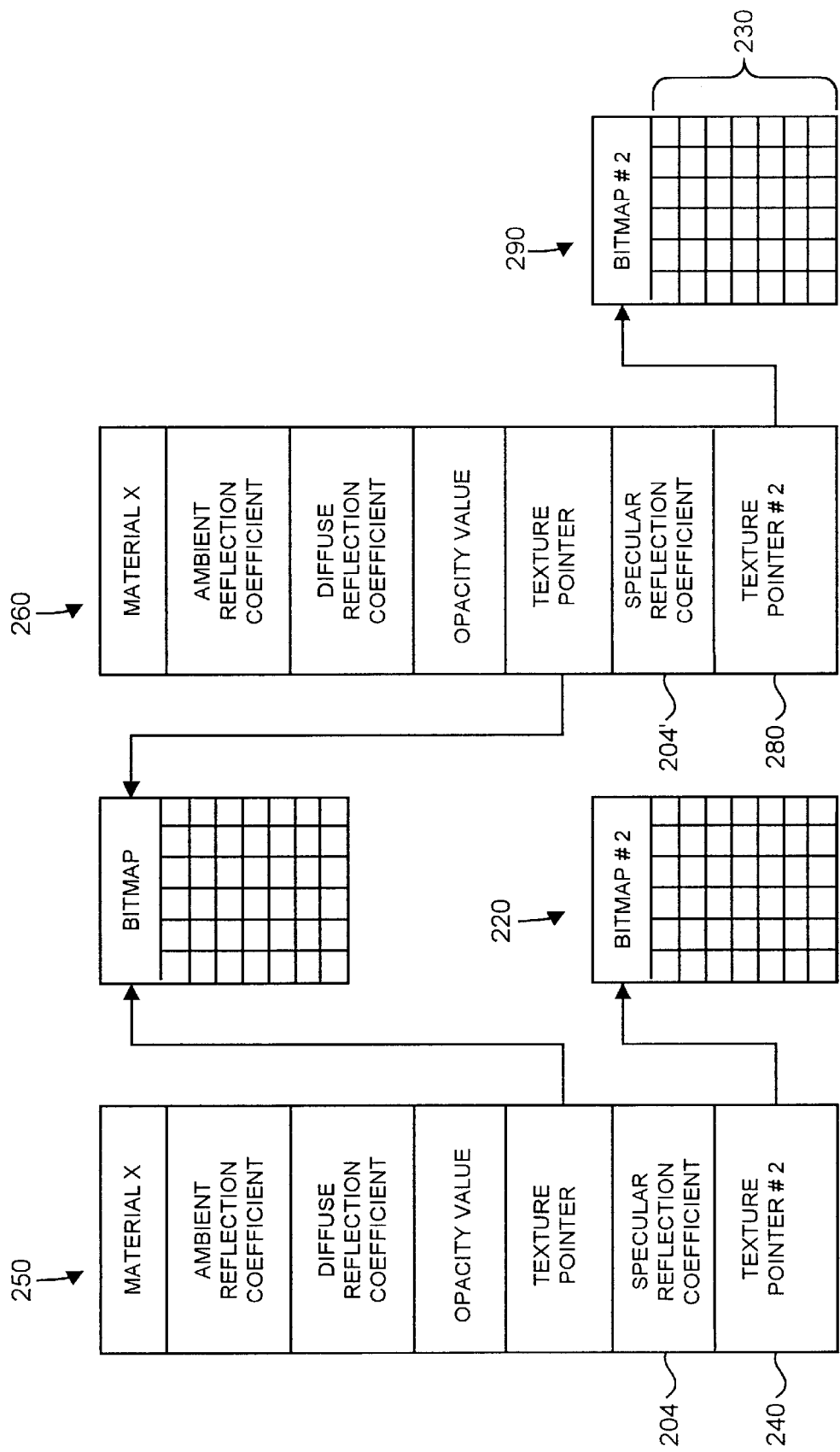

Thus, referring to the example shown in FIGS. 14*a* and 14*b*, at step S13-4, processing apparatus 40 copies the attribute data 204 defining the specular reflection coefficient from the object instance 250 to the newly created object instance 260.

At step S13-16, object duplicator code 112 causes processing apparatus 40 to determine whether any more extension entries 150, 170 exist in the extension list 122 in the extension record 8-1 for the given object type. Additional entries are identified using the double linkage between the entries in the list 122 in a forward direction. Steps S13-12 to S13-16 are repeated until processing has been performed for each extension entry 150, 170 in the manner described above.

Referring to the example shown in FIG. 14*b*, the second time step S13-14 is performed, in this embodiment, object duplicator code 25-5 stored in extension entry 170 from plug-in 32 causes processing apparatus 40 to read the attribute data 240 defining the second texture pointer and the data defining the second bitmap object instance 220 but, rather than adding attribute data to object instance 260 defining a texture pointer to bitmap object instance 220, object duplicator code 25-5 causes processing apparatus 40 to duplicate the second bitmap object instance 220, including texture data 230, to create another instance 290 thereof, and to add attribute data 280 to object instance 260 defining a texture pointer to the new instance 290 of the bitmap object. In this way, the bitmap object instances 220 and 290 can be amended independently.

Figure 15:
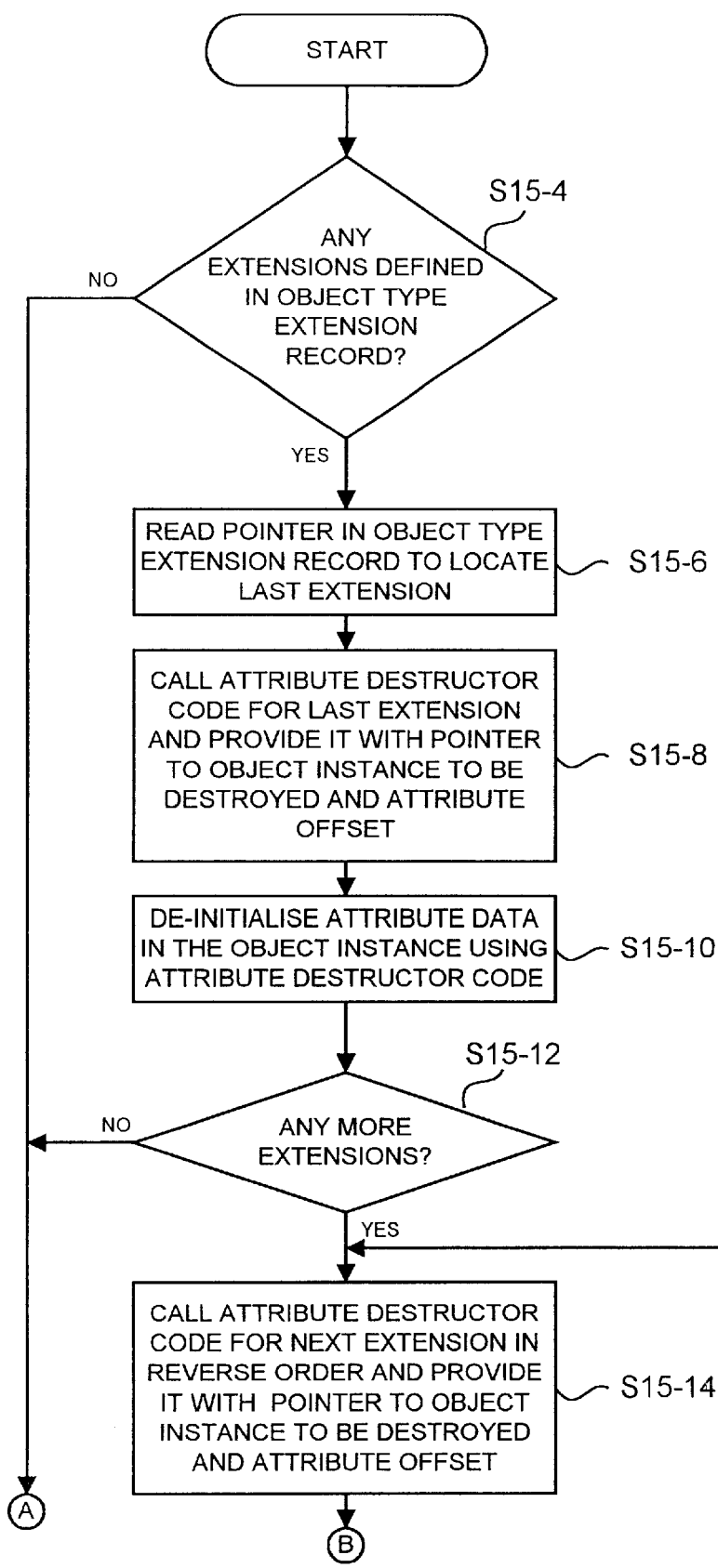
FIG. 15, which as now drawn consists of two portions, one of which is drawn on one sheet and is labeled "FIG. 15" and the other of which is on a second sheet and is labeled "FIG. 15 (CONT)"
Figure 15:
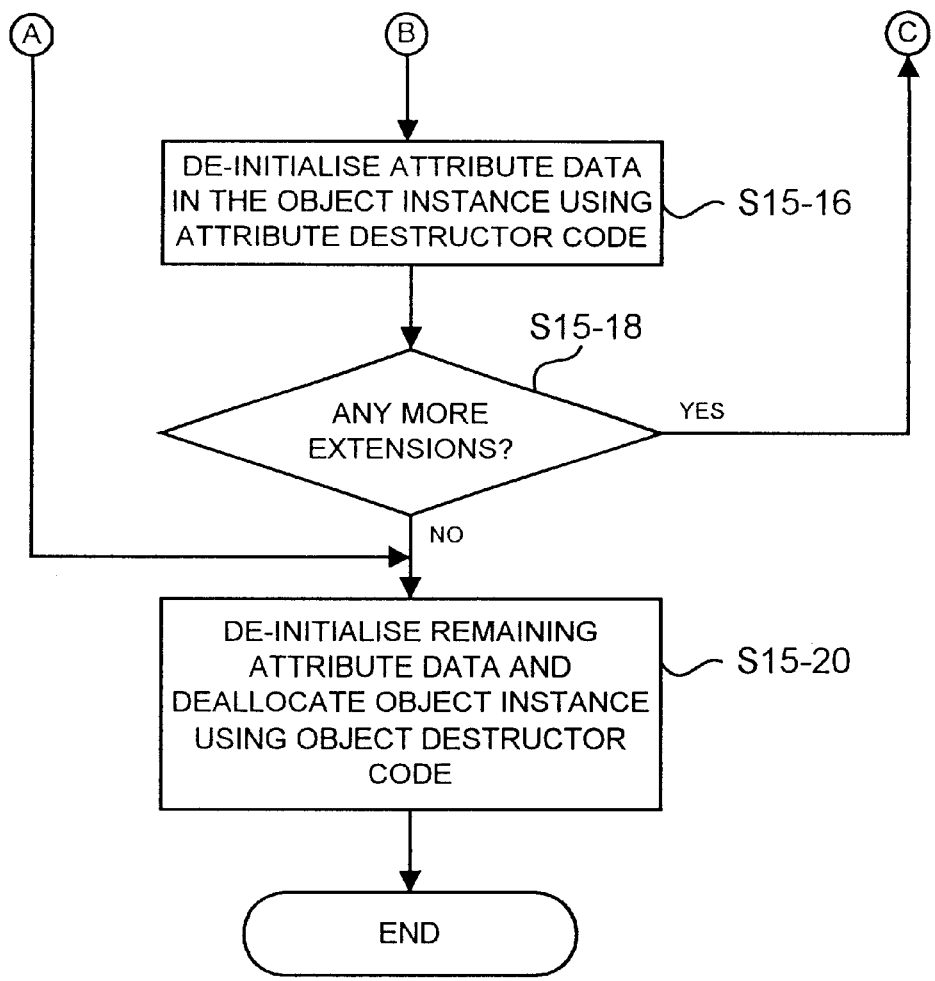

FIG. 15 shows the processing operations performed by the processing apparatus 40 of the application product user whenever the application product is run and the software instructions 18 therein call object destructor code 114 for a given type of object from the tool kit 4 to destroy an instance of the given object type.

Referring to FIG. 15, at step S15-4, object duplicator code 114 causes processing apparatus 40 to read the extension record 8-1 for the given object type to determine therefrom whether any extension entries 150, 170 exist in the extension list 122 stored in the extension record 8-1.

If it is determined at step S15-4 that an extension entry 150, 170 exists in the extension list 122, then, at step S15-6, object destructor code 114 causes processing apparatus 40 to read the pointer 126 in the extension record 8-1 to locate the last extension entry 170 in the extension list 122.

At step S15-8, object destructor code 114 causes processing apparatus 40 to call the attribute destructor code 24-6 stored in the extension record 170 read at step S15-6 and to provide the attribute destructor code with a pointer defining the location of the object instance to be destroyed and the attribute offset defined in attribute offset data 160 in the extension entry 170 located at step S15-6.

At step S15-10, attribute destructor code 24-6 called at step S15-8 causes processing apparatus 40 to de-initialise the memory containing the attribute data in the object instance being destroyed at the position defined by the attribute offset.

Thus, referring to the example of material object instance 250 shown in FIG. 11*d*, at step S15-10, processing apparatus 40 performs processing in accordance with the attribute destructor code 24-6 from plug-in 32 to de-initialise the memory containing the second bitmap object 220 and texture data 230 therein and the memory containing the attribute data 240 defining the second texture pointer.

At step S15-12, object destructor code 114 causes processing apparatus 40 to read the extension list 122 in the extension record 8-1 to determine whether any more extension entries 150, 170 exist therein.

If it is determined at step S15-12 that a further extension entry 150, 170 does exist in the extension list 122, then, at step S15-14, object destructor code 114 causes processing apparatus 40 to call the attribute destructor code 24-6 for the next extension entry 150 in reverse order in the list 122 (the next extension in reverse order being identified using the double linkage of the extension entries 150, 170 in the reverse direction). Attribute destructor code 114 also provides the attribute destructor code 24-6 with a pointer defining the location of the object instance to be destroyed and the data 160 defining the attribute offset which is stored in the same extension entry as the attribute destructor code 24-6.

At step S15-16, processing apparatus 40 de-initialises the memory containing the attribute data in the object instance at the location defined by the attribute offset using the attribute destructor code 24-6 called at step S15-14. Accordingly, referring to the example shown in FIG. 11*d*, at step S15-16, attribute destructor code 24-6 for extension entry 150 causes processing apparatus 40 to de-initialise the memory storing attribute data 204 defining the specular reflection coefficient for the object instance 250.

At step S15-18, object destructor code 114 causes processing apparatus 40 to determine whether any more extension entries 150, 170 exist in extension list 122. Steps S15-14 to S15-18 are repeated until each extension entry 150, 170 has been processed in the manner described above.

If it is determined at step S15-4 that no extension entries 150, 170 exist in the extension list 122 in the extension record 8-1 for the given object type, or if it is determined at step S15-12 or step S15-18 that no further extension entries 150, 170 remain to be processed, then, at step S15-20, object instructor code 114 causes processing apparatus 40 to de-initialise the memory containing the remaining attributes for the object instance, that is the attribute data created by the object creator code 110 in tool kit 4 (this includes de-initialising memory containing object instances, such as bitmap object 62, pointed to by the attribute data in the object to be destroyed and data therein, such as texture data), and to deallocate all of the memory for the object instance (the amount of memory to be deallocated being determined from the size defined by object size data 120 in the extension record 8-1).

In accordance with the processing described above with reference to FIG. 15, attribute data created in accordance with processing instructions from a plug-in is de-initialised in accordance with de-initialised instructions from the plug-in, and attribute data defined in accordance with processing instructions from tool kit 4 is de-initialised in accordance with de-initialised instructions from tool kit 4.

Many modifications are possible to the embodiment described above.

For example, in the embodiment described above, data 24-1 defining the plug-in identification is stored in the extension entry 150, 170 for the plug-in in the object type extension record 8-1. Similarly, attribute offset data 160 is stored for each extension entry 150, 170. Each time function code 25-2 from the plug-in needs to perform a processing operation on attribute data added to an object by the plug-in, the plug-in ID is sent to the tool kit 4 and, in response thereto, the tool kit 4 sends the plug-in the data 160 defining the attribute offset (that is, the position in the object at which the attribute data added by the plug-in can be found). Alternatively, however, when the plug-in is registered with the tool kit 4, the attribute offset data 160 may be determined by tool kit 4 and returned to the plug-in for storage in a data record therein, so that the attribute offset need not be requested from the tool kit 4 each time processing is to be performed by function code 25-2 from the plug-in.

In the embodiment above, at step S7-10 during registration of a plug-in 22, 32 with the tool kit 4, the attribute creator code 24-4, the attribute duplicator code 24-5 and the attribute destructor code 24-6 from the plug-in 22, 32 is stored in the object type extension record 8-1 of the tool kit 4. However, instead of storing code from the plug-in 22, 32 in extension record 8-1, a respective address may be stored for each block of code 24-4, 24-5 and 24-6 defining the location of the code or a "callback" to the code may be provided. When required during processing, the respective code 24-4, 24-5, 24-6 would then be called using the address or callback stored in extension record 8-1.

In the embodiment described above, the processing operations which each plug-in 22, 32 causes processing apparatus 14 or 40 to perform are wholly defined in the plug-in itself. For example, attribute creator code 24-4 from a plug-in 22, 32 causes processing apparatus 14 to perform all of the necessary processing operations to add an attribute to an object instance (step S10-14), and function definition code 25-2 from a plug-in 22, 32 causes processing apparatus 40 to perform all of the processing operations necessary to carry out the specified function (step S12-10). However, attribute creator code 24-4, attribute duplicator code 24-5, attribute destructor code 24-6 and/or function definition code 25-2 from a plug-in 22, 32 may call function code from a further plug-in to cause processing apparatus 14, 40 to carry out processing operations. Similarly, a An plug-in 22, 32, may use data records 26 from a different plug-in. When a plug-in 22, 32 registers with the tool kit 4 (FIG. 7 in the embodiment above), the plug-in being registered may test for the presence of other plug-ins by requesting the identification from tool kit 4 of plug-ins which have already been registered. In this way, a plug-in can determine whether a function or data from the different plug-in can be used in processing.

In the embodiment above, each plug-in 22, 32 contains attribute creator code 24-4, attribute duplicator code 24-5 and attribute destructor code 24-6 for only one type of object. However, a single plug-in may contain attribute creator code, attribute duplicator code and attribute destructor code for more than one type of object.

In the embodiment described above, the processing described with reference to FIG. 7 to register a plug-in 22, 32 with the software development kit 4 is performed by the processing apparatus 14 of the application product developer. However, instead, the processing operations to register each plug-in 22, 32 with the tool kit 4 may be performed by processing apparatus 40 of the application product user.

What is claimed is:

1. A computer program product comprising instructions for causing a programmable processing apparatus to become operable to create an instances of an object type for object-oriented processing, the instructions comprising:

instructions derived from a compiled instruction source for causing the programmable processing apparatus to store first initialisation instructions for the object type for causing the programmable processing apparatus to define at least one initial attribute for each object instance;

instructions derived from a plug-in for causing the programmable processing apparatus to store second initialisation instructions for the object type for causing the programmable processing apparatus to define at least one further attribute for each object instance;

instructions for causing the programmable processing apparatus to store extension data for the object type without creating a new object type including data defining an amount of memory required for each instance of the object type having the at least one initial attribute and the at least one further attribute and data from which the second initialisation instructions to be used to define the at least one further attribute can be determined; and instructions for causing the programmable processing apparatus in response to each instruction to create an instance of the object type to:

read the extension data to determine the amount of memory and to allocate memory for the object instance in accordance therewith as allocated memory;

initialise a first part of the allocated memory using the first initialisation instructions to define the at least one initial attribute for the object instance;

read the extension data to determine the second initialisation instructions; and initialise a second part of the allocated memory using the second initialisation instructions to define the at least one further attribute for the object instance without creating an instance of a new object type.

2. A computer program product according to claim 1, wherein:

the instructions for causing the programmable processing apparatus to store extension data include instructions for causing the programmable processing apparatus to store extension data for the object type which further includes data from which an attribute position in the allocated memory at which the at least one further attribute is to be stored can be determined; and the instructions for causing the programmable processing apparatus to initialise the second part of the allocated memory comprise instructions for causing the programmable processing apparatus to initialise the second part using the second initialisation instructions to define the at least one further attribute at the attribute position.

3. A computer program product according to claim 2, wherein the data from which an attribute position in the allocated memory at which the at least one further attribute is to be stored can be determined comprises data specifying the attribute position as a position relative to the start of the allocated memory.

4. A computer program product according to claim 2, further comprising instructions for causing the programmable processing apparatus to perform processing operations on each object instance by reading the at least one further attribute from the object instance using the attribute position and performing processing using the at least one further attribute read from the attribute position.

5. A computer program product according to claim 1, wherein the instructions for causing the programmable processing apparatus to store extension data for the object type comprise:
  instructions for causing the programmable processing apparatus to store extension data for the object type including data defining an amount of memory required for each instance of the object type having the at least one attribute; and
  instructions for causing the programmable processing apparatus to amend the extension data without creating a new object type to include data from which an amount of memory required for each instance of the object type having the at least one initial attribute and the at least one further attribute can be determined and data from which second initialisation instructions to be used to define the at least one further attribute can be determined.

6. A computer program product according to claim 1, wherein the extension data includes the second initialisation instructions.

7. A computer program product according to claim 1, further comprising:
  instructions derived from the compiled information source for causing the programmable processing apparatus to store first duplicator instructions for the object type for causing the programmable processing apparatus to duplicate the at least one initial attribute;
  instructions derived from the plug-in for causing the programmable processing apparatus to store second duplicator instructions for the object type for causing the programmable processing apparatus to duplicate the at least one further attribute;
  instructions for causing the programmable processing apparatus to store the extension data including data from which the second duplicator instructions to be used to duplicate the at least one further attribute can be determined; and
  instructions for causing the programmable processing apparatus in response to each instruction to duplicate an instance of the object type to:
    read the extension data to determine the amount of memory defined therein, and to allocate memory for a duplicated object instance in accordance therewith with as second allocated memory;
    initialise a first part of the second allocated memory using the first duplicator instructions to define the at least one initial attribute for the duplicated object instance;
    read the extension data to determine the second duplicator instructions; and
    initialise a second part of the second allocated memory using the second duplicator instructions to define the at least one further attribute for the duplicated object instance.

8. A computer program product according to claim 1, further comprising:
  instructions derived from the compiled instruction source for causing the programmable processing apparatus to store first destructor instructions for the object type for causing the programmable processing apparatus to de-initialise memory containing the at least one initial attribute in an object instance to be destroyed;
  instructions derived from the plug-in for causing the programmable processing apparatus to store second destructor instructions for the object type for causing the programmable processing apparatus to de-initialise memory containing the at least one further attribute in an object instance to be destroyed;
  instructions for causing the programmable processing apparatus to store the extension data including data from which the second destructor instructions to be used to de-initialise memory containing the at least one further attribute can be determined; and
  instructions for causing the programmable processing apparatus in response to each instruction to destroy an instance of the object type to:
    read the extension data to determine the second destructor instructions;
    de-initialise memory containing the at least one further attribute in the object instance to be destroyed using the second destructor instructions; and
    de-initialise memory containing the at least one initial attribute in the object instance to be destroyed using the first destructor instructions.

9. A computer processing apparatus for creating instances of an object type for object-oriented processing, comprising:
  a memory storing:
    first initialisation instructions for the object type derived from a compiled instruction source for causing the processing apparatus to define at least one initial attribute for each object instance;
    second initialisation instructions for the object type derived from a plug-in for causing the processing apparatus to define at least one further attribute for each object instance without creating an instance of a new object type; and
    extension data for the object type which includes, without creating a new object type, data defining an amount of memory required for each instance of the object type having the at least one initial attribute and the at least one further attribute and data from which the second initialisation instructions to be used to define the at least one further attribute can be determined; and
  a controller for causing the processing apparatus in response to each instruction to create an instance of the object type to:
    read the extension data to determine the amount of memory and to allocate memory for the object instance in accordance therewith as allocated memory;
    initialise a first part of the allocated memory using the first initialisation instructions to define the at least one initial attribute for the object instance;

read the extension data to determine the second initialisation instructions; and initialise a second part of the allocated memory using the second initialisation instructions to define the at least one further attribute for the object instance without creating an instance of a new object type.

10. In a computer processing apparatus, a method of creating instances of an object type for object-oriented processing, comprising:

storing first initialisation instructions for the object type derived from a compiled instruction source for causing the processing apparatus to define at least one initial attribute for each object instance;

storing second initialisation instructions for the object type derived from a plug-in for causing the processing apparatus to define at least one further attribute for each object instance; and storing extension data for the object type without creating a new object type including data defining an amount of memory required for each instance of the object type having the at least one initial attribute and the at least one further attribute and data from which the second initialisation instructions to be used to define the at least one further attribute can be determined; and causing the processing apparatus in response to each instruction to create an instance of the object type to:
read the extension data to determine the amount of memory and to allocate memory for the object instance in accordance therewith as allocated memory;
initialise a first part of the allocated memory using the first initialisation instructions to define the at least one initial attribute for the object instance;
read the extension data to determine the second initialisation instructions; and
initialise a second part of the allocated memory using the second initialisation instructions to define the at least one further attribute for the object instance without creating an instance of a new object type.

11. A computer program product comprising instructions for causing a programmable processing apparatus to become operable to create instances of an object type for object-oriented processing, the instructions comprising:

instructions for causing the programmable processing apparatus to store first initialisation instructions for the object type derived from a compiled instruction source for causing the programmable processing apparatus to define at least one initial attribute for the object instance;

instructions for causing the programmable processing apparatus to store extension data for the object type without creating a new object type including data defining whether or not each instance of the object type is to have a further attribute, data defining an amount of memory required for each instance of the object type having the at least one initial attribute and, if any, the further attribute and, if the object type is to have a further attribute, data from which second initialisation instructions derived from a plug-in to be used to define the further attribute can be determined; and instructions for causing the programmable processing apparatus in response to each instruction to create an instance of the object type to:
read the extension data to determine the amount of memory and to allocate memory for the object instance in accordance therewith as allocated memory;
read the extension data to determine if each instance of the object is to have a further attribute; and
initialise the allocated memory without creating an instance of a new object type using the first initialisation instructions or the first and second initialisation instructions in dependence upon whether each instance of the object is to have a further attribute.

12. A computer processing apparatus for creating instances of an object type for object-oriented processing, comprising:

a memory storing:
first initialisation instructions for the object type derived from a compiled instruction source for causing the processing apparatus to define at least one initial attribute for the object instance; and
extension data for the object type including data defining whether or not each instance of the object type is to have a further attribute without creating a new object type, data defining an amount of memory required for each instance of the object type having the at least one initial attribute and, if any, the further attribute and, if the object type is to have a farther attribute, data from which second initialisation instructions derived from a plug-in to be used to define the further attribute can be determined; and a controller for causing the processing apparatus in response to each instruction to create an instance of the object type to:
read the extension data to determine the amount of memory and to allocate memory for the object instance in accordance therewith as allocated memory;
read the extension data to determine if each instance of the object is to have a further attribute; and
initialise the allocated memory without creating an instance of a new object type using the first initialisation instructions or the first and second initialisation instructions in dependence upon whether each instance of the object is to have a further attribute.

13. In a computer processing apparatus, a method of creating instances of an object type for object-oriented processing, comprising:

storing first initialisation instructions for the object type derived from a compiled instruction source for causing the programmable processing apparatus to define at least one initial attribute for the object instance;

storing extension data for the object type without creating a new object type including data defining whether or not each instance of the object type is to have a further attribute, data defining an amount of memory required for each instance of the object type having the at least one initial attribute and, if any, the further attribute and, if the object type is to have a further attribute, data from which second initialisation instructions derived from a plug-in to be used to define the further attribute can be determined; and causing the processing apparatus in response to each instruction to create an instance of the object type to:
read the extension data to determine the amount of memory and to allocate memory for the object instance in accordance therewith as allocated memory;
read the extension data to determine if each instance of the object is to have a further attribute; and
initialise the allocated memory without creating an instance of a new object type using the first initialisation instructions or the first and second initialisation instructions in dependence upon whether each instance of the object is to have a further attribute.

14. A computer program product comprising compiled computer program code defining instructions for causing a programmable processing apparatus to become operable to create instances of an object type for object-oriented processing, the instructions comprising:

instructions for causing the programmable processing apparatus to store first initialisation instructions for the object type for initialising memory to define at least one initial attribute for each object instance;

instructions for causing the programmable processing apparatus to store extension data for the object type including data defining an amount of memory required for each instance of the object type having the at least one initial attribute;

instructions for causing the programmable processing apparatus to become operable to receive request data requiring each instance of the object type to be created with at least one further attribute, and in response thereto to amend the extension data without creating a new object type to include data from which an amount of memory required for each instance of the object type having the at least one initial attribute and the at least one further attribute can be determined and data from which second initialisation instructions to be used to define the at least one further attribute can be determined; and instructions for causing the programmable processing apparatus to store instructions for the creation of each instance of the object type in dependence upon the extension data without creating an instance of a new object type.

15. A computer program product according to claim 14, wherein the instructions for the creation of each instance of the object type comprise instructions to create each instance by:

reading the extension data to determine the amount of memory and allocating memory for each object instance in accordance therewith as allocated memory;

reading the extension data to determine if each instance of the object is to have a further attribute; and initialising the allocated memory using the first initialisation instructions or the first and second initialisation instructions in dependence upon whether each instance of the object is to have a further attribute.

16. A computer program product according to claim 14, wherein the instructions for causing the programmable processing apparatus to amend the extension data include instructions for causing the programmable processing apparatus to calculate an attribute position in each object instance at which the at least one further attribute is to be stored, and to include data in the extension data from which the attribute position can be determined.

17. A computer program product according to claim 16, wherein the instructions for causing the programmable processing apparatus to calculate the attribute position comprise instructions for causing the programmable processing apparatus to calculate the attribute position as a position relative to the start of the memory for each object instance.

18. A computer program product according to claim 14, wherein the compiled computer program code further comprises:

instructions for causing the programmable processing apparatus to store first duplicator instructions for the object type for duplicating the at least one initial attribute;

instructions for causing the programmable processing apparatus to amend the extension data to include data from which second duplicator instructions for duplicating the at least one further attribute can be determined; and instructions for causing the programmable processing apparatus to store instructions for the duplication of each instance of the object type in dependence upon the extension data.

19. A computer program product according to claim 14, wherein the compiled computer program code further comprises:

instructions for causing the programmable processing apparatus to store first destructor instructions for the object type for de-initialising memory containing the at least one initial attribute in each instance of the object type to be destroyed;

instructions for causing the programmable processing apparatus to amend the extension data to include data from which second destructor instructions for de-initialising memory containing the at least one further attribute can be determined; and instructions for causing the programmable processing apparatus to store instructions for the destruction of each instance of the object type in dependence upon the extension data.

20. A computer processing apparatus, comprising:

a memory storing compiled computer program instructions comprising:

first initialisation instructions for an object type for initialising memory to define at least one initial attribute for each instance of the object type;

extension data for the object type including data defining an amount of memory required for each instance of the object type having the at least one initial attribute; and instructions for the creation of each instance of the object type in dependence upon the extension data without creating an instance of a new object type; and a controller for causing the apparatus to become operable to receive request data requiring each instance of the object type to be created with at least one further attribute, and in response thereto to amend the extension data without creating a new object type to include data from which an amount of memory required for each instance of the object type having the at least one initial attribute and the at least one further attribute can be determined and data from which second initialisation instructions to be used to define the at least one further attribute can be determined.

21. In a computer processing apparatus, a method of generating instructions for the creation of instances of an object type for object-oriented processing, comprising:

storing compiled computer program instructions defining:

first initialisation instructions for the object type for initialising memory to define at least one initial attribute for each object instance;

extension data for the object type including data defining an amount of memory required for each instance of the object type having the at least one initial attribute; and instructions for the creation of each instance of the object type in dependence upon the extension data without creating an instance of a new object type; and in response to a request requiring each instance of the object type to be created with at least one further attribute, amending the extension data without creating a new object type to include data from which an amount of memory required for each instance of the object type having the at least one initial attribute and the at least one further attribute can be determined and data from which second initialisation instructions to be used to define the at least one further attribute can be determined.

22. A computer program product comprising compiled computer program code defining instructions for causing a programmable processing apparatus to become operable to create instances of an object type for object-oriented processing, the instructions comprising:

instructions for causing the programmable processing apparatus to store first initialisation instructions for the object type for initialising memory to define at least one initial attribute for each object instance;

instructions for causing the programmable processing apparatus to store extension data for the object type without creating a new object type including a list for storing data from which further initialisation instructions can be determined;

instructions for causing the programmable processing apparatus, in response to request data requiring each instance of the object type to be created with at least one further attribute, to amend the list without creating a new object type to include data from which second initialisation instructions to be used to define the at least one further attribute can be determined; and instructions for causing the programmable processing apparatus to store instructions for the creation of each instance of the object type in dependence the first initialisation instructions and the extension data without creating an instance of a new object type.

23. A computer processing apparatus, comprising:

a memory storing compiled computer program code defining:

first initialisation instructions for an object type for initialising memory to define at least one initial attribute for each instance of the object type;

extension data for the object type including a list for storing data from which further initialisation instructions can be determined; and instructions for the creation of each instance of the object type in dependence the first initialisation instructions and the extension data without creating an instance of a new object type; and a controller for causing the programmable processing apparatus, in response to request data requiring each instance of the object type to be created with at least one further attribute, to amend the list without creating a new object type to include data from which second initialisation instructions to be used to define the at least one further attribute can be determined.

24. In a computer processing apparatus, a method of generating instructions for the creation of instances of an object type for object-oriented processing, comprising:

storing compiled computer program code defining:

first initialisation instructions for the object type for initialising memory to define at least one initial attribute for each object instance;

extension data for the object type including a list for storing data from which further initialisation instructions can be determined; and instructions for the creation of each instance of the object type in dependence the first initialisation instructions and the extension data without creating an instance of a new object type; and in response to a request requiring each instance of the object type to be created with at least one further attribute, amending the list without creating a new object type to include data from which second initialisation instructions to be used to define the at least one further attribute can be determined.

25. A computer program product comprising instructions for controlling a programmable processing apparatus, the instructions comprising:

instructions for instructing each instance of an object type to be created for object-oriented processing with at least one additional attribute without creating a new object type;

instructions from which an amount of memory required for the at least one additional attribute can be determined; for use in creating extension data for the object type and instructions for initialising a part of memory allocated to each instance of the object type to define the at least one additional attribute for each object instance without creating an instance of a new object type.

26. A computer program product according to claim 25, further comprising instructions for performing processing operations on each instance of the object type by performing processing using the at least one further attribute.

27. A computer program product according to claim 25, further comprising instructions for duplicating the at least one further attribute for each duplicated object instance.

28. A computer program product according to claim 25, further comprising instructions for de-initialising memory containing the at least one further attribute in each object instance to be destroyed.

29. A computer processing apparatus, comprising:

a memory storing:

instructions for instructing each instance of an object type to be created for object-oriented processing with at least one additional attribute without creating a new object type;

instructions from which the processing apparatus can determine an amount of memory required for the at least one additional attribute; for use in creating extension data for the object type and a memory initialiser for initialising a part of memory allocated to each instance of the object type to define the at least one additional attribute for each object instance without creating an instance of a new object type.

30. A method of controlling a computer processing apparatus, comprising:

instructing the apparatus to create each instance of an object type for object-oriented processing with at least one additional attribute without creating a new object type;

providing data from which an amount of memory required for the at least one additional attribute can be determined for use in creating extension data for the object type; and initialising a part of memory allocated to each instance of the object type to define the at least one additional attribute for each object instance without creating an instance of a new object type.

31. A computer program product for controlling a programmable processing apparatus having stored therein a computer program product according to claim 14, comprising:

instructions for causing the processing apparatus to initialise a part of memory allocated to each instance of the object type to define the at least one additional attribute for each object instance without creating an instance of a new object type; and data for use in the processing apparatus to amend the extension data without creating a new object type.

32. A computer program product for controlling a programmable processing apparatus having stored therein a computer program product according to claim 22, comprising:

instructions for causing the processing apparatus to initialise a part of memory allocated to each instance of the object type to define the at least one additional attribute for each object instance without creating an instance of a new object type; and data for use in the processing apparatus to amend the extension data without creating a new object type.

33. A method of controlling a programmable processing apparatus having stored therein a computer program product according to claim 14, comprising:

storing in the apparatus instructions for causing the processing apparatus to initialise a part of memory allocated to each instance of the object type to define the at least one additional attribute for each object instance without creating an instance of a new object type; and providing data for use by the processing apparatus to amend the extension data without creating a new object type.

34. A method of controlling a programmable processing apparatus having stored therein a computer program product according to claim 22, comprising:

storing in the apparatus instructions for causing the processing apparatus to initialise a part of memory allocated to each instance of the object type to define the at least one additional attribute for each object instance without creating an instance of a new object type; and providing data for use by the processing apparatus to amend the extension data without creating a new object type.

35. A computer program product according to any of claims 1, 11, 14, 22, 25, 31 and 32 when embodied as a storage device storing the instructions.

36. A computer program product according to any of claims 1, 11, 14, 22, 25, 31 and 32 when embodied as a signal conveying the instructions.

37. A method of producing data defining an object-oriented software application product, comprising:

(a) writing software instructions for causing a programmable processing apparatus to carry out processing operations when the application is run, the software instructions including instructions which call:

(i) compiled instructions from a library, including instructions for causing the programmable processing apparatus to create instances of an object type for object-oriented processing, comprising:

first initialisation instructions for the object type for causing the programmable processing apparatus to initialise memory to define at least one initial attribute for each object instance;

instructions for causing the programmable processing apparatus to store extension data for the object type including data defining an amount of memory required for each instance of the object type having the at least one initial attribute;

instructions for causing, in response to request data requesting each instance of the object type to be created with at least one further attribute, to amend the extension data without creating a new object type to include data from which an amount of memory required for each instance of the object type having the at least one initial attribute and the at least one further attribute can be determined and data from which second initialisation instructions to be used to define the at least one further attribute can be determined; and instructions for causing the programmable processing apparatus to create each instance of the object type in dependence upon the extension data without creating an instance of a new object type; and (ii) instructions from a plug-in, comprising:

instructions for requesting each instance of the object type to be created with at least one further attribute without creating a new object type;

instructions from which the processing apparatus can determine the amount of memory required for the at least one further attribute; and instructions for causing the processing apparatus to initialise a part of memory allocated to each instance of the object type to define the at least one additional attribute for each object instance without creating an instance of a new object type; and (b) compiling the software instructions and the instructions called thereby to generate compiled data defining the software application product.

38. A method according to claim 37, further comprising a step of recording the compiled data either directly or indirectly to produce a recording thereof.

39. A method according to claim 37, further comprising a step of generating a signal conveying the compiled data.

40. A method of producing data defining an object-oriented software application product, comprising:

(a) writing software instructions for causing a programmable processing apparatus to carry out processing operations when the application is run, the software instructions including instructions which call:

(i) compiled instructions from a library, including instructions for causing the programmable processing apparatus to create instances of an object type for object-oriented processing, comprising:

first initialisation instructions for the object type for causing the programmable processing apparatus to initialise memory to define at least one initial attribute for each object instance;

instructions for causing the programmable processing apparatus to store extension data for the object type including data defining an amount of memory required for each instance of the object type having the at least one initial attribute;

instructions for causing, in response to request data requesting each instance of the object type to be created with at least one further attribute, the extension data to be amended without creating a new object type to include data from which an amount of memory required for each instance of the object type having the at least one initial attribute and the at least one further attribute can be determined and data from which second initialisation instructions to be used to define the at least one further attribute can be determined; and instructions for causing the programmable processing apparatus to create each instance of the object type in dependence upon the extension data without creating an instance of a new object type; and (ii) instructions from a plug-in, comprising:
  instructions for requesting each instance of the object type to be created with at least one further attribute without creating a new object type;
  instructions from which the processing apparatus can determine the amount of memory required for the at least one further attribute; and
  instructions for causing the processing apparatus to initialise a part of memory allocated to each instance of the object type to define the at least one additional attribute for each object instance without creating an instance of a new object type;
(b) without creating a new object type, amending the extension data to include data from which an amount of memory required for each instance of the object type having the at least one initial attribute and the at least one further attribute can be determined and data from which second initialisation instructions to be used to define the at least one further attribute can be determined; and
(c) compiling the software instructions and the instructions called thereby to generate compiled data defining the software application product.

41. A method according to claim 40, further comprising a step of recording the compiled data either directly or indirectly to produce a recording thereof.

42. A method according to claim 40, further comprising a step of generating a signal conveying the compiled data.

43. A computer processing apparatus for creating instances of an object type for object-oriented processing, comprising:
  memory means storing:
    first initialisation instructions for the object type derived from a compiled instruction source for causing the processing apparatus to define at least one initial attribute for each object instance;
    second initialisation instructions for the object type derived from a plug-in for causing the processing apparatus to define at least one further attribute for each object instance without creating an instance of a new object type; and
    extension data for the object type which includes, without creating a new object type, data defining an amount of memory required for each instance of the object type having the at least one initial attribute and the at least one further attribute and data from which the second initialisation instructions to be used to define the at least one further attribute can be determined; and
  means for causing the processing apparatus in response to each instruction to create an instance of the object type to:
    read the extension data to determine the amount of memory and to allocate memory for the object instance in accordance therewith as allocated memory;
    initialise a first part of the allocated memory using the first initialisation instructions to define the at least one initial attribute for the object instance;
    read the extension data to determine the second initialisation instructions; and
    initialise a second part of the allocated memory using the second initialisation instructions to define the at least one further attribute for the object instance without creating an instance of a new object type.

44. A computer processing apparatus for creating instances of an object type for object-oriented processing, comprising:
  memory means storing:
    first initialisation instructions for the object type derived from a compiled instruction source for causing the processing apparatus to define at least one initial attribute for the object instance; and
    extension data for the object type including data defining whether or not an each instance of the object type is to have a further attribute without creating a new object type, data defining an amount of memory required for each instance of the object type having the at least one initial attribute and, if any, the further attribute and, if the object type is to have a further attribute, data from which second initialisation instructions derived from a plug-in to be used to define the further attribute can be determined; and
  means for causing the processing apparatus in response to each instruction to create an instance of the object type to:
    read the extension data to determine the amount of memory and to allocate memory for the object instance in accordance therewith as allocated memory;
    read the extension data to determine if each instance of the object is to have a further attribute; and
    initialise the allocated memory without creating an instance of a new object type using the first initialisation instructions or the first and second initialisation instructions in dependence upon whether each instance of the object is to have a further attribute.

45. A computer processing apparatus, comprising:
  memory means storing compiled computer program instructions comprising:
    first initialisation instructions for an object type for initialising memory to define at least one initial attribute for each instance of the object type;
    extension data for the object type including data defining an amount of memory required for each instance of the object type having the at least one initial attribute; and
    instructions for the creation of each instance of the object type in dependence upon the extension data without creating an instance of a new object type; and
  means for causing the apparatus to become operable to receive request data requiring each instance of the object type to be created with at least one further attribute, and in response thereto to amend the extension data without creating a new object type to include data from which an amount of memory required for each instance of the object type having the at least one initial attribute and the at least one further attribute can be determined and data from which second initialisation instructions to be used to define the at least one further attribute can be determined.

46. A computer processing apparatus, comprising:
  memory means storing compiled computer program code defining:
    first initialisation instructions for an object type for initialising memory to define at least one initial attribute for each instance of the object type;
    extension data for the object type including a list for storing data from which further initialisation instructions can be determined; and
    instructions for the creation of each instance of the object type in dependence the first initialisation instructions and the extension data without creating an instance of a new object type; and means for causing the programmable processing apparatus, in response to request data requiring each instance of the object type to be created with at least one further attribute, to amend the list without creating a new object type to include data from which second initialisation instructions to be used to define the at least further attribute can be determined.

47. A computer processing apparatus, comprising:

memory means storing:

instructions for instructing each instance of an object type to be created for object-oriented processing with at least one additional attribute without creating a new object type;

instructions from which the processing apparatus can determine an amount of memory required for the at least one additional attribute; for use in creating extension data for the object type and means for initialising a part of memory allocated to each instance of object type to define the at least one additional attribute for each object instance without creating an instance of a new object type.

\* \* \* \* \*

UNITED STATES PATENT AND TRADEMARK OFFICE
CERTIFICATE OF CORRECTION

PATENT NO. : 6,671,800 B1
DATED : December 30, 2003
INVENTOR(S) : Thomas C. McInally et al.

It is certified that error appears in the above-identified patent and that said Letters Patent is hereby corrected as shown below:

Title page,
Item [56], References Cited, FOREIGN PATENT DOCUMENTS, "0623615 A" should read -- 6-236315 A --.

Column 3,
Line 19, "steps" should read -- steps S 10-6 to S10-16 in Fig. 10; --.
Line 23, "plug-in" should read --plug-in;--. `-
Line 34, "Fig. 15" should be deleted.

Column 8,
Line 57, "step." should read -- step --.

Column 16,
Line 17, "an" should be deleted.

Column 20,
Line 21, "farther" should read -- further --

Column 23,
Line 34, "dependence" should read -- dependence upon --.
Line 47, "dependence" should read -- dependence upon --.

Column 24,
Line 2, "dependence" should read -- dependence upon --.
Line 19, "mined;" should read -- mined --.
Line 20, "type" should read -- type; --.
Line 43, "attribute;" should read -- attribute --.
Line 44, "type" should read -- type; --

Column 28,
Line 67, "dependence" should read -- dependence upon --.

UNITED STATES PATENT AND TRADEMARK OFFICE
CERTIFICATE OF CORRECTION

PATENT NO. : 6,671,800 B1
DATED : December 30, 2003
INVENTOR(S) : Thomas C. McInally et al.

It is certified that error appears in the above-identified patent and that said Letters Patent is hereby corrected as shown below:

Column 30,
Line 5, "attribute;" should read -- attribute --.
Line 6, "type" should read -- type; --.

Signed and Sealed this

Twenty-first Day of September, 2004

JON W. DUDAS
*Director of the United States Patent and Trademark Office*